US005537579A

United States Patent [19]
Hiroyuki

[11] Patent Number: 5,537,579
[45] Date of Patent: Jul. 16, 1996

[54] METHOD AND APPARATUS FOR MANAGING COLOR DATA

[75] Inventor: Kaneda Hiroyuki, Kawasaki, Japan

[73] Assignee: Fujitsu Limited, Kanagawa, Japan

[21] Appl. No.: 198,278

[22] Filed: Feb. 18, 1994

[30] Foreign Application Priority Data

Mar. 19, 1993 [JP] Japan .................................... 5-060141

[51] Int. Cl.[6] ............................ G06F 3/153; G09G 5/06

[52] U.S. Cl. .......................... 395/500; 395/131; 345/155; 345/199

[58] Field of Search .................................... 395/500, 131; 382/162; 358/515, 518, 527; 345/186, 199, 188, 155; 348/390, 391

[56] References Cited

U.S. PATENT DOCUMENTS

| | | | |
|---|---|---|---|
| 4,710,806 | 12/1987 | Iwai et al. | 348/391 |
| 5,003,299 | 3/1991 | Batson et al. | 340/703 |
| 5,162,925 | 11/1992 | Takaoka et al. | 358/447 |
| 5,278,678 | 1/1994 | Harrington | 358/518 |
| 5,309,551 | 5/1994 | Guttag et al. | 395/131 |
| 5,337,166 | 8/1994 | Ikegami | 358/518 |
| 5,363,218 | 11/1994 | Hoshino | 358/518 |
| 5,406,310 | 4/1995 | Aschenbrenner et al. | 345/150 |
| 5,434,957 | 7/1995 | Moller | 395/131 |

FOREIGN PATENT DOCUMENTS

| | | |
|---|---|---|
| 0525527 | 2/1993 | European Pat. Off. . |
| 0526989 | 2/1993 | European Pat. Off. . |
| 60-19359 | 1/1985 | Japan . |
| 4-352288 | 12/1992 | Japan . |

*Primary Examiner*—Kevin Teska
*Assistant Examiner*—Tan Nguyen
*Attorney, Agent, or Firm*—Staas & Halsey

[57] ABSTRACT

A method and apparatus for managing color data in a predetermined color space by using a pallet converting mechanism, in which a pallet management table can be efficiently registered and updated. An entry number accessing a table entry in the pallet management table is formed by combining the components of the color data. Table data, obtained by combining remaining components of the color data which are not used for the formation of the entry number, is stored into the table entry identified by the entry number. There is also the conversion of color data to pallet data, which corresponds to entry numbers, and the reverse conversion to reconstruct the original color data from pallet data and entry number information. Validity information indicative of the validity of the table entry is also registered into the table entry of the pallet management table, so that an available table entry at the time of new registration can be immediately found out.

34 Claims, 22 Drawing Sheets

FIG. 1 PRIOR ART

| ENTRY NUMBER | R | G | B | |
|---|---|---|---|---|
| 0 | 0 | 0 | 0 | ⇨ 「BLACK」 |
| 1 | 0 | 0 | 15 | ⇨ 「BLUE」 |
| 2 | 0 | 15 | 0 | ⇨ 「GREEN」 |
| 3 | 15 | 0 | 0 | ⇨ 「RED」 |
| 4 | | 15 | 15 | ⇨ 「YELLOW」 |
| 5 | 15 | 0 | 15 | ⇨ 「PINK」 |
| 6 | 15 | 15 | 0 | ⇨ 「LIGHT BLUE」 |
| 7 | 16 | 16 | 16 | ⇨ 「UNREGISTRATION」 |

| | | | |
|---|---|---|---|
| 15 | 15 | 15 | ⇨ 「WHITE」 |

| | | | |
|---|---|---|---|
| 13 | 0 | 0 | ⇨ 「PALE RED」 |

| VALID BIT | RESULT OF COMPARISON OF RGB TABLE DATA | JUDGMENT |
|---|---|---|
| INVALID | COINCIDENCE | CONTENTS OF DESIGNATED PALLET ENTRY IS INVALID. UNREGISTERED ENTRY. |
| INVALID | DISSIDENSE | |
| VALID | COINCIDENCE | QUITE SAME AS REGISTERED DATA |
| VALID | DISSIDENSE | DIFFER FROM REGISTERED DATA |

FIG. 8

| ENTRY | R | G | B | ENTRY | R | G | B | ENTRY | R | G | B | ENTRY | R | G | B | ENTRY | R | G | B |
|---|---|---|---|---|---|---|---|---|---|---|---|---|---|---|---|---|---|---|---|
| 0 | 0 | 0 | 0 | 8 | 0 | 8 | 0 | 16 | 4 | 0 | 0 | 24 | 4 | 8 | 0 | 32 | 8 | 0 | 0 |
| 1 | 0 | 0 | 4 | 9 | 0 | 8 | 4 | 17 | 4 | 0 | 4 | 25 | 4 | 8 | 4 | 33 | 8 | 0 | 4 |
| 2 | 0 | 0 | 8 | 10 | 0 | 8 | 8 | 18 | 4 | 0 | 8 | 26 | 4 | 8 | 8 | 34 | 8 | 0 | 8 |
| 3 | 0 | 0 | 12 | 11 | 0 | 8 | 12 | 19 | 4 | 0 | 12 | 27 | 4 | 8 | 12 | 35 | 8 | 0 | 12 |
| 4 | 0 | 4 | 0 | 12 | 0 | 12 | 0 | 20 | 4 | 4 | 0 | 28 | 4 | 12 | 0 | 36 | 8 | 4 | 0 |
| 5 | 0 | 4 | 4 | 13 | 0 | 12 | 4 | 21 | 4 | 4 | 4 | 29 | 4 | 12 | 4 | 37 | 8 | 4 | 4 |
| 6 | 0 | 4 | 8 | 14 | 0 | 12 | 8 | 22 | 4 | 4 | 8 | 30 | 4 | 12 | 8 | 38 | 8 | 4 | 8 |
| 7 | 0 | 4 | 12 | 15 | 0 | 12 | 12 | 23 | 4 | 4 | 12 | 31 | 4 | 12 | 12 | 39 | 8 | 4 | 12 |

| ENTRY | R | G | B | ENTRY | R | G | B | ENTRY | R | G | B |
|---|---|---|---|---|---|---|---|---|---|---|---|
| 40 | 8 | 8 | 0 | 48 | 12 | 0 | 0 | 56 | 12 | 8 | 0 |
| 41 | 8 | 8 | 4 | 49 | 12 | 0 | 4 | 57 | 12 | 8 | 4 |
| 42 | 8 | 8 | 8 | 50 | 12 | 0 | 8 | 58 | 12 | 8 | 8 |
| 43 | 8 | 8 | 12 | 51 | 12 | 0 | 12 | 59 | 12 | 8 | 12 |
| 44 | 8 | 12 | 0 | 52 | 12 | 4 | 0 | 60 | 12 | 12 | 0 |
| 45 | 8 | 12 | 4 | 53 | 12 | 4 | 4 | 61 | 12 | 12 | 4 |
| 46 | 8 | 12 | 8 | 54 | 12 | 4 | 8 | 62 | 12 | 12 | 8 |
| 47 | 8 | 12 | 12 | 55 | 12 | 4 | 12 | 63 | 12 | 12 | 12 |

FIG. 16

| ENTRY | R | G | B | ENTRY | R | G | B | ENTRY | R | G | B | ENTRY | R | G | B | ENTRY | R | G | B |
|---|---|---|---|---|---|---|---|---|---|---|---|---|---|---|---|---|---|---|---|
| 0 | 0 | 0 | 0 | 8 | 2 | 0 | 0 | 16 | 4 | 0 | 0 | 24 | 6 | 0 | 0 | 32 | 8 | 0 | 0 |
| 1 | 0 | 0 | 8 | 9 | 2 | 0 | 8 | 17 | 4 | 0 | 8 | 25 | 6 | 0 | 8 | 33 | 8 | 0 | 8 |
| 2 | 0 | 8 | 0 | 10 | 2 | 8 | 0 | 18 | 4 | 8 | 0 | 26 | 6 | 8 | 0 | 34 | 8 | 8 | 0 |
| 3 | 0 | 8 | 8 | 11 | 2 | 8 | 8 | 19 | 4 | 8 | 8 | 27 | 6 | 8 | 8 | 35 | 8 | 8 | 8 |
| 4 | 1 | 0 | 0 | 12 | 3 | 0 | 0 | 20 | 5 | 0 | 0 | 28 | 7 | 0 | 0 | 36 | 9 | 0 | 0 |
| 5 | 1 | 0 | 8 | 13 | 3 | 0 | 8 | 21 | 5 | 0 | 8 | 29 | 7 | 0 | 8 | 37 | 9 | 0 | 8 |
| 6 | 1 | 8 | 0 | 14 | 3 | 8 | 0 | 22 | 5 | 8 | 0 | 30 | 7 | 8 | 0 | 38 | 9 | 8 | 0 |
| 7 | 1 | 8 | 8 | 15 | 3 | 8 | 8 | 23 | 5 | 8 | 8 | 31 | 7 | 8 | 8 | 39 | 9 | 8 | 8 |

| ENTRY | R | G | B | ENTRY | R | G | B | ENTRY | R | G | B |
|---|---|---|---|---|---|---|---|---|---|---|---|
| 40 | 10 | 0 | 0 | 48 | 12 | 0 | 0 | 56 | 14 | 0 | 0 |
| 41 | 10 | 0 | 8 | 49 | 12 | 0 | 8 | 57 | 14 | 0 | 8 |
| 42 | 10 | 8 | 0 | 50 | 12 | 8 | 0 | 58 | 14 | 8 | 0 |
| 43 | 10 | 8 | 8 | 51 | 12 | 8 | 8 | 59 | 14 | 8 | 8 |
| 44 | 11 | 0 | 0 | 52 | 13 | 0 | 0 | 60 | 15 | 0 | 0 |
| 45 | 11 | 0 | 8 | 53 | 13 | 0 | 8 | 61 | 15 | 0 | 8 |
| 46 | 11 | 8 | 0 | 54 | 13 | 8 | 0 | 62 | 15 | 8 | 0 |
| 47 | 11 | 8 | 8 | 55 | 13 | 8 | 8 | 63 | 15 | 8 | 8 |

METHOD AND APPARATUS FOR MANAGING COLOR DATA

BACKGROUND OF THE INVENTION

The present invention relates to a method and apparatus for managing color data which is used for processing of color data which is necessary for display a color display, color printing by a printer, or the like and, more particularly, to a method and apparatus for managing color data in which a small number of color data to be used in actual processes is registered into a pallet table from among a number of color data of a color space which is constructed by a plurality of components of RGB or the like and the color data is expressed and processed by an entry number of a table whose data length is short.

When a color is expressed on a computer, it is a general way to express a color in color spaces such as RGB space which is expressed by a combination of R, G, and B components as three attributes of a color, color space which is expressed by a combination of C, M, Y, and K components which are obtained by converting the RGB space into data for printing, further, CIE L*a*b* space which is expressed by a combination of L*, a*, and b* components which are obtained by converting the RGB space by numerical arithmetic operations and coincide with human eyesight characteristics, CIE L*u*v* space which is expressed by a combination of L*, u*, and v* components, or the like.

In case of the RGB space, for example, the number of bits as expressing means of an information amount is allocated to three variables of R, G, and B in correspondence to the necessary number of expressing colors. For instance, assuming that 4096 colors are needed, 4 bits are allocated to each variable, thereby enabling 16 stages to be expressed. Since there are 3 variables, expressing means of $16^3$=4096 kinds is used.

On the other hand, in an output apparatus such as a display apparatus, printing apparatus, or the like, in order to enable a number of colors to be simultaneously output, a large amount of resources such as memory devices, output devices, and the like are needed and an apparatus of a high speed and high function is needed, thereby causing an increase in costs. Therefore, by using a pallet converting mechanism having a structure such that the number of colors which can be simultaneously output is limited to, for example, 16 colors and these 16 colors are not fixed but can be arbitrarily selected from 4096 colors, a variety of colors can be expressed although they are limited.

FIG. 1 shows a method for managing color data using a conventional pallet converting mechanism and shows, as an example, a case where 16 colors are arbitrarily selected from 4096 colors and expressed. A table which has, for example, eight entries of 0 to 7 and can store RGB data of 12 bits (4 bits×3) is prepared as a pallet management table. When data is processed, transmitted, converted, or the like, RGB data up to 16 colors is arbitrarily selected from 4096 colors and registered into the pallet management table. With respect to the data processing, transfer, conversion, or the like, RGB data having a construction of 12 bits is not used but an entry number of 3 bits indicative of the RGB data registered in the pallet management table is used. When data is actually output to a color display, a printer, or the like, the data is reconstructed to the original RGB data by using the pallet management table. By the method of managing color data using such a pallet structure as mentioned above, the processing amount for color data is reduced and the reduction of memory capacity and high speed and high efficiency of processes can be realized.

However, in the conventional color data managing method using such a pallet converting mechanism, which kind of RGB data has actually been registered into the pallet management table for the entry number can be known only by actually retrieving the table and there is the following problems. For instance, in case of a new registration, it is necessary to read out the contents in the table with respect to all of the entry numbers, to confirm space entries, and to execute a registering process. In case of updating the registration, it is necessary to read out the contents in the table with respect to all of the entry numbers, to compare with the RGB data to be updated, to judge the presence or absence of the same contents, and to execute a rewriting process of the contents in the table according to the result of the judgment. Therefore, in order to newly register or update one entry, accessing of all entries is needed and it takes a long time for the registration updating process of the contents in the table.

Explanation will now be made specifically with reference to FIG. 1. It is now assumed that the RGB data has already been registered in seven entries of the entry number 0 to 6 in the pallet management table having eight entries of the entry numbers 0 to 7. In this case, the RGB in which each data of R, G, and B has values of 0 to 15 is valid as data. Therefore, the entry number 7 in which the data value of 16 which is invalid as each data value of R, G, and B has been registered can be recognized as an unregistered entry. When the RGB data "White" is newly registered in this situation, all of the entry numbers 0 to 7 are first retrieved, thereby detecting an unregistered area. Since the entry number 7 is not registered yet here, the RGB data of "White" can be registered into the entry number 7. Subsequently, after the RGB data "White" was registered, when the RGB data "Pale red" is registered, an additional registration cannot be executed because there is no unregistered entry already. In such a case, in the color data managing method of the pallet converting mechanism, as a typical method, in many cases, by making the color to be registered correspond to the entry number of the color that is nearest to such a registration color, such a color is replaced by a "Likelihood color" although the color which is expressed differs.

In FIG. 1, when "Pale red" whose RGB data is constructed by '13, 0, 0' is registered, all of the entries are first retrieved, thereby recognizing that there is no unregistered region. Subsequently, all of the entries are retrieved again and the entry number 3 "Red" whose RGB data is constructed by '15, 0, 0' and which gives a color that is nearest to "Pale red" is extracted and the RGB data "Pale red" is registered into the entry number 3. In this case, it is necessary to execute the retrieval of all entries two times. In the conventional color data managing method using the pallet structure as mentioned above, there is a problem such that it takes a long time for the accessing of all entries at the time of the new registration or the change of the registration.

SUMMARY OF THE INVENTION

According to the invention, method and apparatus for managing color data which can effectively perform the registration and updating of a pallet management table and can provide a flexibility to a converting relation between the color data using a pallet structure and the entry numbers are provided.

An apparatus of the invention comprises a pallet management table (LUT) as a pallet which has entries of the number as many of the number of color data which are selected from a large number of color data in a predetermined color space comprising a plurality of components, for example, in an RGB space and into which identification (ID) information (valid bit) indicative of the presence or absence of the use of each entry and a table data to specify the color data are stored.

The pallet management table comprises: an entry number forming section to form an entry number having a data length shorter than that of color data by combining portions in the color data; and a table data forming section to form table data to be stored into the pallet management table by combining the remaining portions in the color data which is not used in the formation of the entry numbers. A table registration updating section to perform new registration or updating of the pallet management table on the basis of the color data selected from the color space is also provided. Further, there are provided: a converting section which receives the color data of the color space and converts into the pallet data expressed by the entry number in the pallet management table; and a reverse converting section which receives the pallet data expressed by the entry number and returns to the color data in the color space.

In this instance, the entry number forming section forms the entry number by either one of the following combinations.

I. combination of upper bits of a plurality of components constructing the color data;

II. combination of upper bits of the same number with respect to a plurality of components constructing the color data;

III. combination of upper bits of different numbers with respect to a plurality of components constructing the color data;

IV. combination of only upper bits of a specified component among a plurality of components constructing the color data;

V. combination of upper bits and lower bits of a specified component among a plurality of components constructing the color data; and the like.

The registration updating section retrieves the pallet management table by the entry number formed from the input RGB data by the entry number forming section, judges a space entry from the ID information, and registers the table data formed from the input RGB data by the table data forming section into the space entry. When updating in the case where there is no space entry, the registration updating section retrieves the table position of the entry number formed from the input RGB data by the entry number forming section and registers the table data formed from the input RGB data by the table data forming section into such a table position and updates.

As for the conversion from the RGB data to the pallet data by the converting section, the pallet management table is retrieved by the entry number formed from the input RGB data by the entry number forming section, the ID information indicative of the use of the entry is judged, and a check is made to see if the table data coincides with the table data formed from the input RGB data by the table data forming section or not. When they coincide, the formed entry number is converted to an output as pallet data.

In the reverse conversion from the pallet data to the RGB data by the reverse converting section, the pallet data expressed by the entry number is input, the pallet management table is retrieved, and the original RGB data is reconstructed from the table data obtained by retrieving the table and the pallet data (entry number) and is output.

According to another aspect, an apparatus of the invention has a structure of a double-table in which a memory table (second table) is further provided for the pallet management table (first table). In this case, one group is formed by a plurality of color data in a predetermined color space and entry numbers of the pallet management table which are common to the group of color data and each of which has a data length shorter than that of each color data are formed. The table data to be stored into the memory table is formed by combining the remaining portions which are peculiar to each color data which is not used in the formation of the entry number. The table data formed from the remaining portions in the formation of the entry numbers is stored on a group unit basis into the memory table with respect to the color data which formed a group. The ID information (valid bit) indicative of the presence or absence of the use of the entry, the number of color data of the group, and the head memory position in the memory table of the color data of the group are stored into the pallet management table, respectively.

With respect to the conversion from the color data to the pallet data, table data is sequentially read out by only the number of color data from the head memory positions in the memory table obtained by retrieving the pallet management table by the entry numbers formed from the input color data. When the table data formed from the input color data coincides with the read-out table data, the entry number is converted and output as pallet data. On the other hand, in the reverse conversion from the pallet data to the color data, the pallet management table is retrieved by inputting the pallet data expressed by the entry number. The color data at the head memory positions in the memory table obtained by the retrieval is output as reconstruction color data.

In the reverse conversion from the pallet data to the color data, in case of reverse converting the pallet data to arbitrary color data in the group instead of the color data which is specified by the table data at the head memory position, it is sufficient that the table data of the specific color data is registered into a pallet conversion table and the color data is reconstructed on the basis of the table data and the entry number.

Further, with respect to the last position of the group in the memory table, instead of registering the number of data into the pallet management table, a terminate code indicative of the last position can be also added to the registration data in the memory table.

According to the color data managing method and apparatus of the invention, as a method of allocating the storage data to the entry numbers in the pallet management table, by reflecting the contents of the color data to be stored, specifically speaking, by making a portion of the storage data correspond to the entry number, a retrieval range can be easily limited and the access to the unnecessary entry can be prevented. A double structure of the pallet is formed and the table is separated to the management table and the table to store the actual storage data, so that both of high efficiency and flexibility can be further promoted.

The above and other objects features, and advantages of the present invention will become more apparent from the following detailed description with reference to the drawings.

BRIEF DESCRIPTION OF THE DRAWINGS

FIG. 1 is an explanatory diagram of a conventional pallet converting mechanism;

FIG. 8 is an explanatory diagram of RGB data registered in the pallet management table in FIG. 3;

FIG. 16 is an explanatory diagram of RGB data registered in a pallet management table in FIG. 15;

DETAILED DESCRIPTION OF THE PREFERRED EMBODIMENTS

Figure 2:
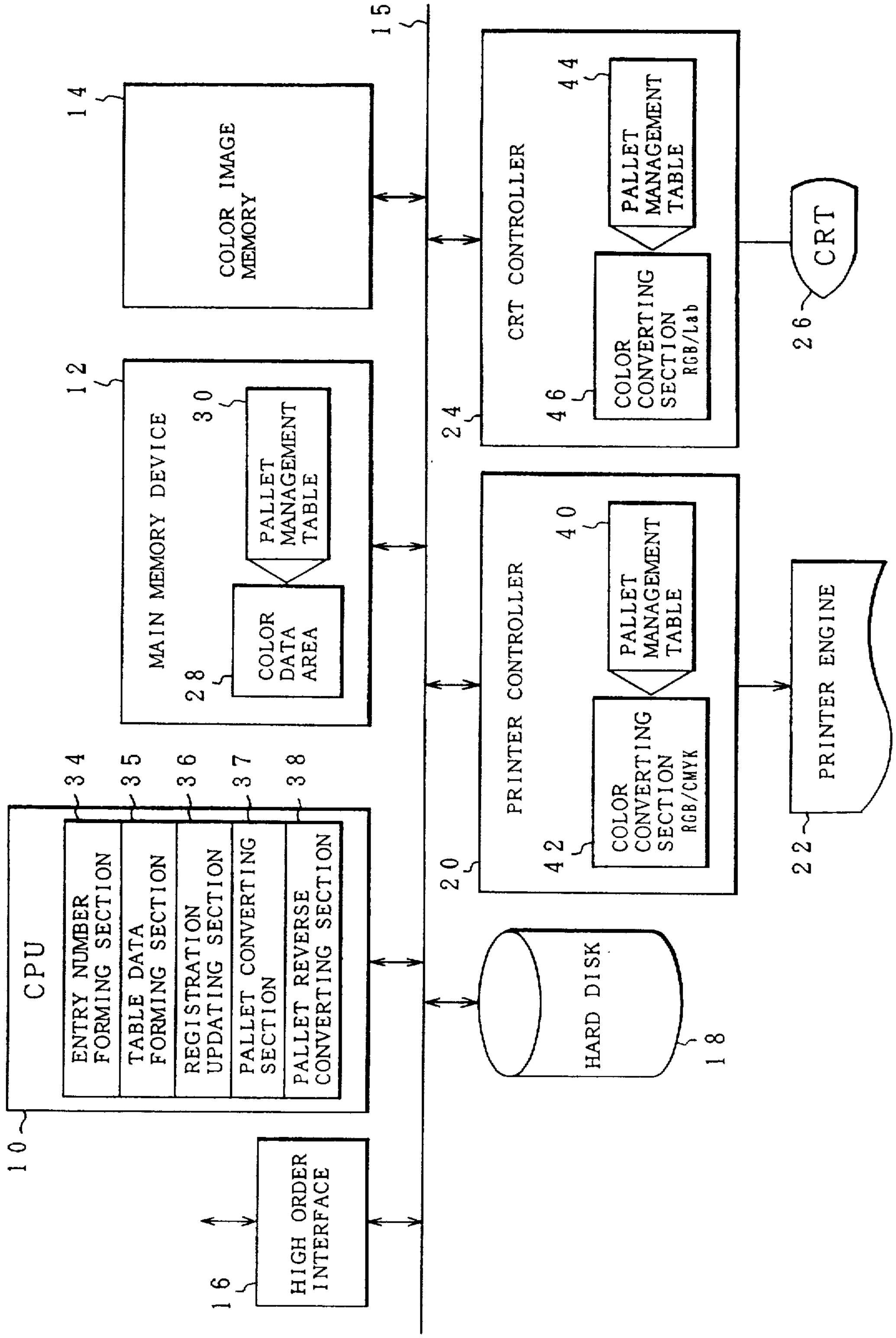
FIG. 2 is a block diagram showing a hardware of a processing apparatus using the invention.

FIG. 2 shows a hardware construction of an information processing apparatus in which a pallet converting mechanism according to the invention is applied. A CPU 10 functions as processing means and realizes an entry number forming section 34, a table data forming section 35, a registration updating section 36, a pallet converting section 37, and a pallet reverse converting section 38 which realize a pallet data converting mechanism of the invention by a program control. A main memory device 12, a color image memory 14, a high-order interface 16, a hard disk 18 which functions as an external memory, a printer controller 20 of a printer engine 22, and a CRT controller 24 of a CRT display 26 are connected to an internal bus 15 of the CPU 10. The main memory device 12 comprises: a pallet management table 30 which is used in the pallet converting mechanism of the invention; and a color data area 28 which stores color data to be converted into pallet data by using the pallet management table 30. In an embodiment of the invention, an RGB space is used as a color space and each RGB information unit is set to 4 bits. Therefore, 4096 colors can be designated. As for the 12-bit color data which designates 4096 colors in the RGB space having 12 bits as mentioned above, the pallet management table 30 can select and register 64 colors among them. The color image memory 14 stores the pallet data which was converted from the RGB data by using the pallet management table 30 and was expressed by the entry number in the pallet management table 30. By using the pallet data, image processing, transfer, conversion, or the like in the apparatus is executed.

The printer controller 20 comprises a pallet management table 40 and a color converting section 42. The pallet management table 40 is a copy of the pallet management table 30 of the main memory device 12. When pallet data in the color image memory 14, which was processed, is transferred to the printer controller 20, reverse conversion to the original RGB data is executed by using the pallet management table 40. The color converting section 42 provided for the printer controller 20 converts the RGB data into the color data for the CMYK space which can be expressed by the printer engine 22 and supplies to the printer engine 22. A method of converting the RGB data into the color data of the CMYK space is realized by, for instance, the following expressions.

$C_0$=NOT (R)

$M_0$=NOT (G)

$Y_0$=NOT (B)

and,

K=min ($C_0$, $M_0$, $Y_0$)

C=$C_0$−K

M=$M_0$−K

Y=$Y_0$−K wherein "NOT" means a logical negation and "min" means a function to fetch the minimum value.

As another converting method, when the reverse conversion into the original RGB data is executed by using the pallet management table 40, it is also possible to form the pallet management table 40 which performs the conversion into the color data for the CMYK space in addition to the above reverse conversion.

The CRT controller 24 comprises a pallet management table 44 and a color converting section 46. The pallet management table 44 is a copy of the pallet management table 30 of the main memory device 12. When pallet data in the color image memory 14, which was processed, is transferred to the CRT controller 24, the pallet data is reversely converted into the original RGB data by using the pallet management table 44. The color converting section 46 converts the RGB data into the color data of, for example, the R'G'B' space which can be expressed by the CRT display 26. It is sufficient that the R'G'B' is the same as the RGB (not converted in this case) and it is also possible to use a space to which the CRT characteristics are reflected.

In FIG. 2, copies of the pallet management table in the main memory device 12 are transferred to the printer controller 20 and CRT controller 24 as pallet management tables 40 and 44 and the reverse conversion from the pallet data into the RGB data is executed on the apparatus side, thereby realizing a high code processing speed. However, it is also possible to construct in a manner such that the CPU 10 reversely converts the pallet data in the color memory 14 into the RGB data by using the pallet management table 30 of the main memory device 12 and, after that, the RGB data is transferred to the printer controller 20 or CRT controller 24. As RGB data is processed in the CPU 10, the RGB data may be transferred from the high-order apparatus by the high-order interface 16 or the RGB data may be stored in the hard disk 18. It is also possible that RGB data is fetched and processed by using an optical reading apparatus.

Figure 3:
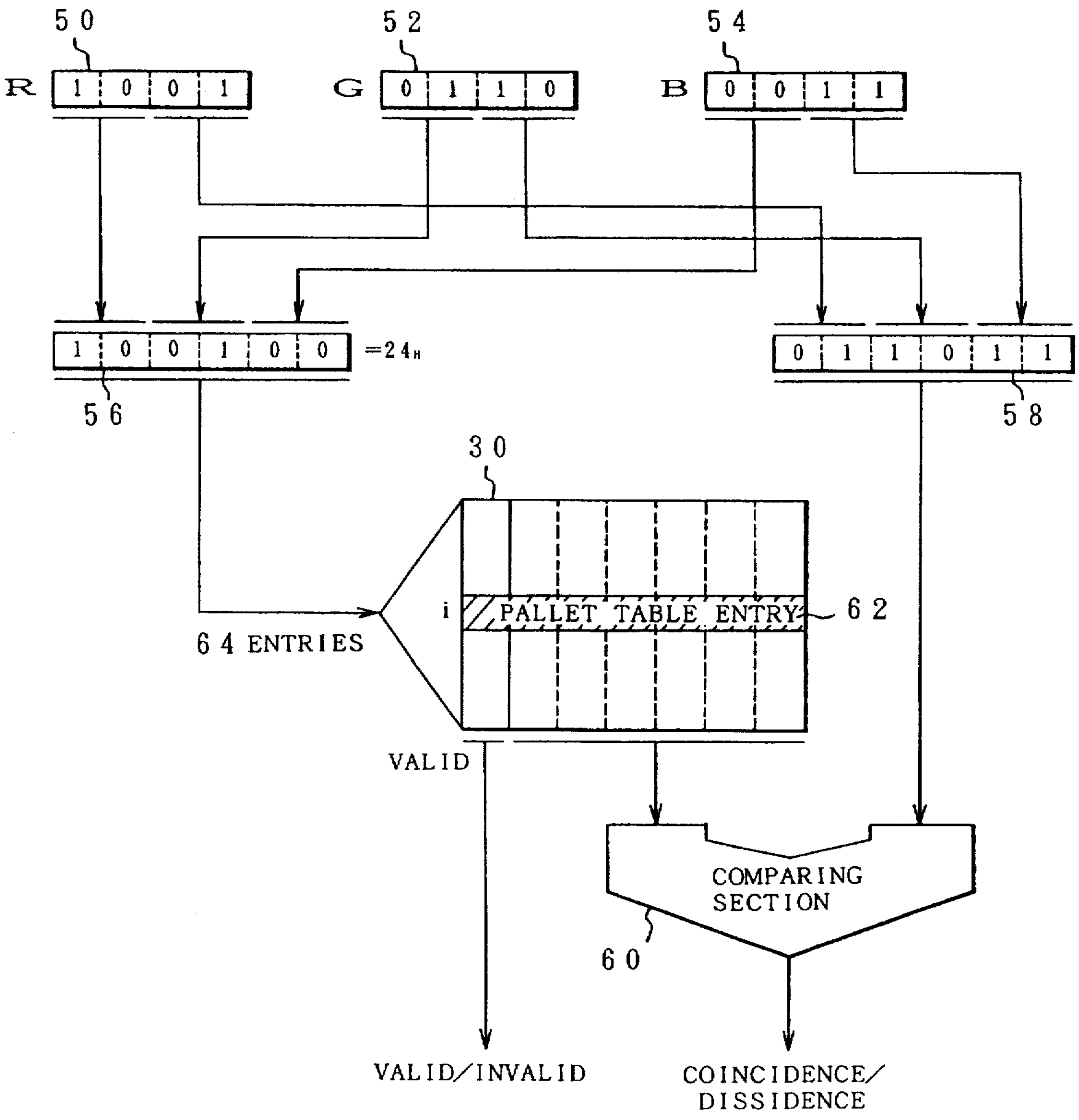
FIG. 3 is a block diagram of a pallet converting mechanism of the invention.

FIG. 3 shows an embodiment of the pallet converting mechanism of the invention. Input registers 50, 52, and 54 of four bits are provided in correspondence to the RGB data, respectively. The input registers receive the RGB data which is registered into the pallet management table 30 or the RGB data to be converted into the pallet data by using the pallet management table 30 and hold it. In the embodiment, since each data of R, G, and B consists of four bits, arbitrary RGB data is obtained from the 4096 colors. In this case, as for the RGB data, a state in which '1011, 0110, 0011' were input is shown. Subsequent to the input registers 50, 52, and 54, an entry register 56 which functions as an entry number forming section and a data register 58 which forms table data to be registered into the pallet management table 30 as a value which is used to reconstruct the RGB data. In the embodiment, since the pallet management table 30 has 64 entries, the entry register 56 is constructed by six bits. In the embodiment, upper two bits of the R data, G data, and B data held in the input registers 50, 52, and 54 are input and the entry number of '100100'=$24_H$ is formed by a combination of those bits. H of $24_H$ indicates that '24' is a hexadecimal number.

On the other hand, the remaining data in the R, G, and B data used for forming the entry number in the entry register 56 is supplied to the data register 58 and is used as table data to reconstruct the original RGB data. Since the entry number is formed by combining of upper two bits of each of the R, G, and B data in the embodiment, the lower two bits of each of the R, G, and B data are combined in the data register 58, thereby forming table data '011011'.

Figures 4, 5:
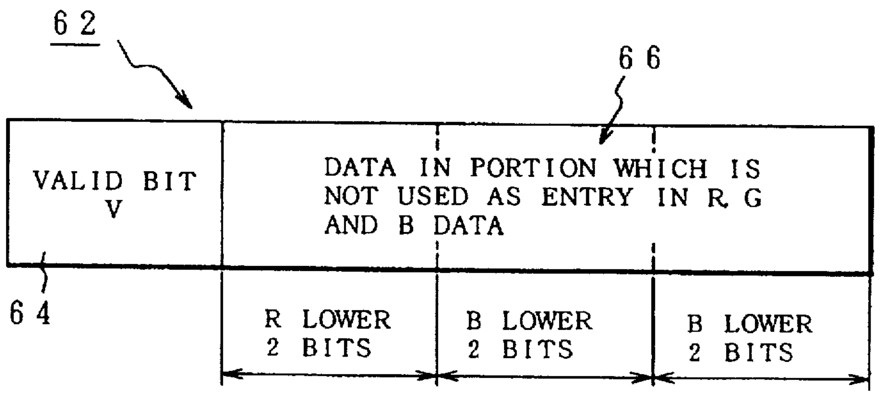
FIG. 4 is an explanatory diagram of the registered contents of a pallet table in FIG. 3.
FIG. 5 is an explanatory diagram of the contents of the judgment based on the result of comparison of valid bits in the pallet management table in FIG. 3 and table data.

A pallet table entry (PTE) 62 is stored into an arbitrary entry i of the pallet management table 30 which is accessed by the entry number from the entry register 56. As shown in FIG. 4, the pallet table entry 62 is constructed by table data 66 formed in the data register 58 subsequently to a valid bit (V) 64. In the embodiment of FIG. 3, the table data 66 is constructed by a combination of lower two bits of each of the R, G, and B data. The valid bit 64 at the head position indicates whether the subsequent table data 66 is valid or not. Namely, when the valid bit V is set to 1 (V=1), it indicates that the table data 66 has effectively been registered. On the other hand, when the valid bit is reset to 0 (V=0), it indicates that the table data 66 is invalid and that the entry is a space entry.

During the registration updating for the pallet management table 30 and the conversion and reverse conversion of the pallet data using the pallet management table 30 in the pallet data converting mechanism in FIG. 3, the processing judgment is executed by the result of the judgment regarding whether the valid bit obtained by retrieving the pallet management table 30 by the entry number is valid or invalid and the result of the comparison by the comparing section 60 regarding whether the table data 66 coincides with the table data formed by the data register 58 or not. The above processes are summarized as shown in FIG. 5.

In FIG. 5, in the case where the valid bit is invalid and the result of the comparison about the RGB table data by the comparing section 60 indicates coincidence or dissidence, it is judged that the contents of the pallet table entry are invalid and indicate the unregistered entry. On the other hand, in the case where the valid bit is valid and the results of the comparison about the R, G, and B table data indicate coincidence, it is judged that the R, G, and B data supplied to the input register 50, 52, and 54 are the same as the table data which were registered in the pallet management table 30. Further, in the case where the result of the comparison by the comparing section 60 indicates dissidence although the valid bit is valid, the data different from the input RGB data has been registered in the pallet management table 30 but respective upper two bits of the R, G, and B data coincide, it is possible to judge that the data is the rewritable approximate RGB data.

Figure 6:
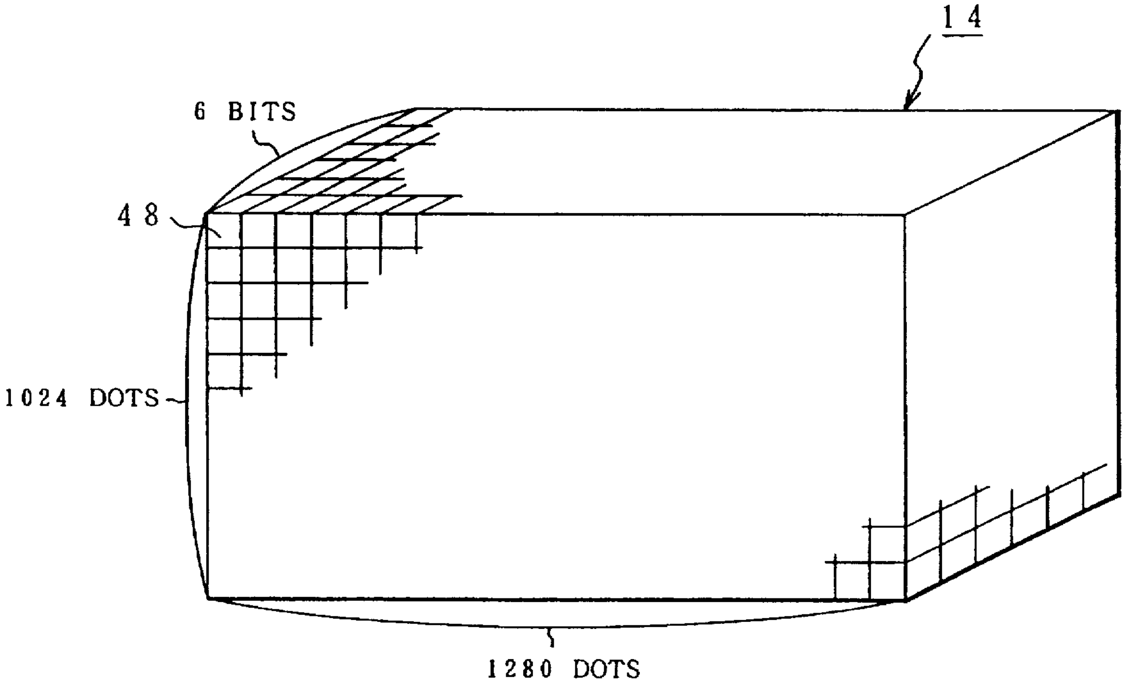
FIG. 6 is an explanatory diagram of a construction of a frame memory in FIG. 2 in which the pallet data has been stored.
Figure 7:
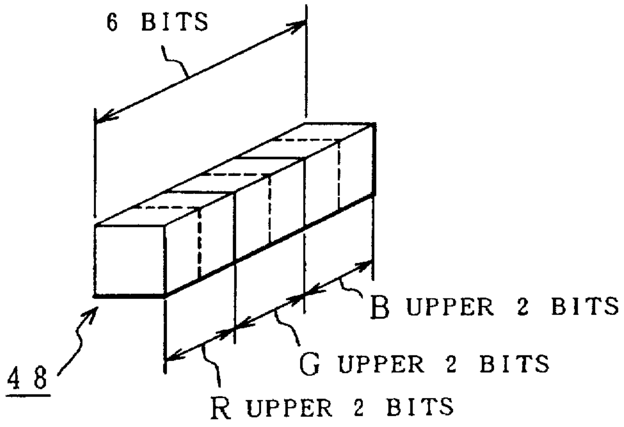
FIG. 7 is an explanatory diagram showing one pixel data extracted from FIG. 6.

FIG. 6 shows a memory structure of the pallet data for the color image memory 14 in FIG. 2. The pallet data obtained from the RGB data by the pallet converting mechanism shown in FIG. 3 is expressed by the pallet data of six bits for the pallet management table 30. Therefore, the color image memory 14 has a size of, for example, 1024×1028 dots and each pixel 48 has a size of six bits in the depth direction. That is, one pixel 48 has a data size of six bits in the depth direction as shown in FIG. 7. The pixel 48 is data obtained by combining upper two bits of each of the R, G, and B data in the entry register 56 as shown in FIG. 3. Although a depth of 12 bits is needed in the case where the RGB data was directly stored, by using the data obtained by converting from the RGB data into the pallet data by the pallet converting mechanism as color data to be stored into the color image memory 14, the depth can be set to the depth of six bits by using the pallet data. Consequently, the processes for storing, transmitting, and the like can be executed in a state in which an amount of RGB data is reduced to the half amount.

FIG. 8 shows a corresponding relation between the RGB data and the entry numbers which are registered into the pallet management table 30 by the pallet converting mechanism in FIG. 3. In FIG. 8, there are 64 kinds of entry numbers of 0 to 63. On the other hand, upper two bits of each of the 4-bit RGB, namely, total six bits are used to form the entry number. Therefore, the RGB data which can be expressed by the entry numbers indicates 64 colors based on combinations of every four other values in each of the RGB values. In this case, the changes of the components of R, G, and B for a change in entry number are equal and uniform changes of 64 colors are selected.

Figure 9:
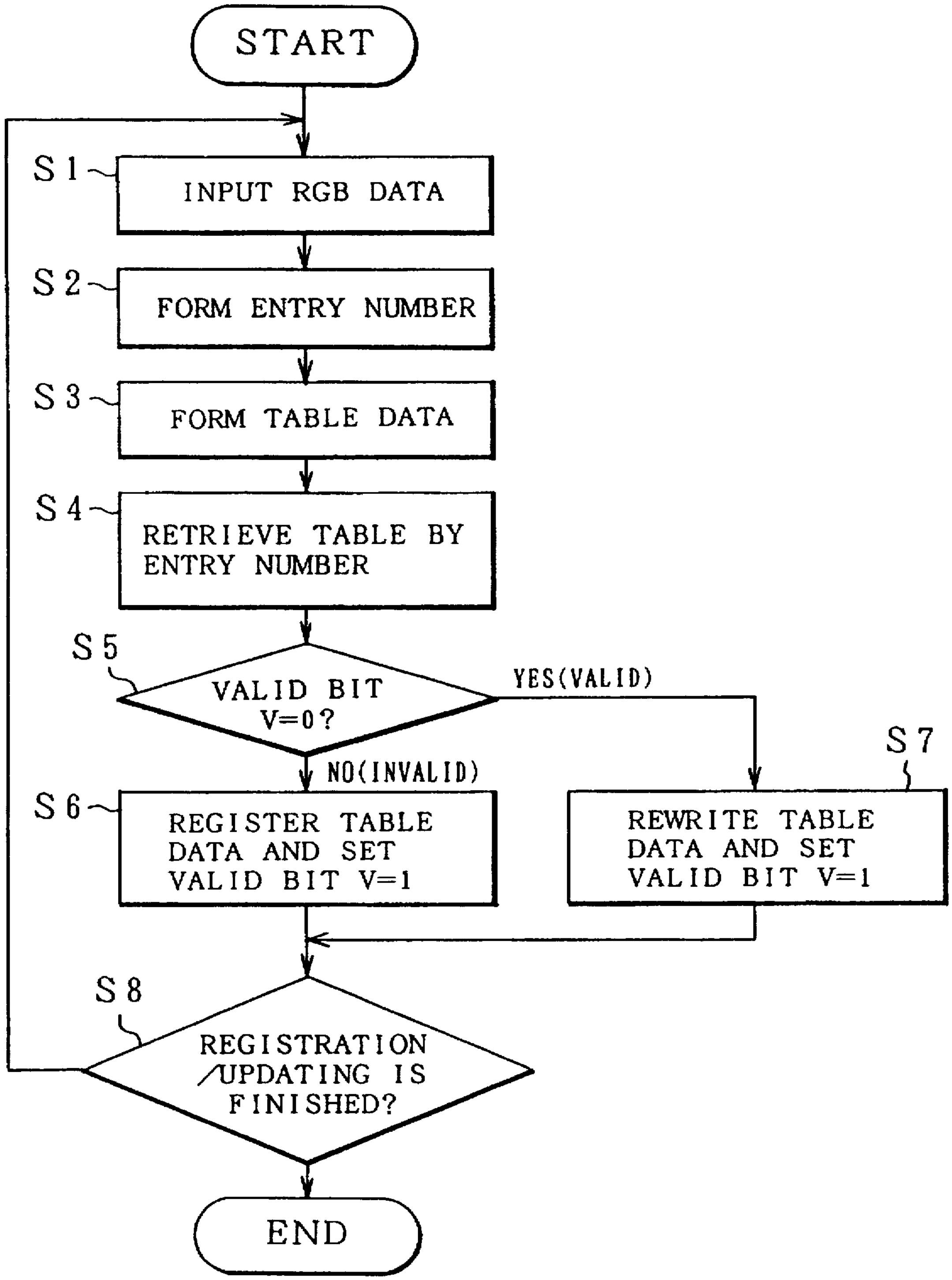
FIG. 9 is a flowchart showing a registration updating process of the RGB data in FIG. 3.

A flowchart of FIG. 9 shows a registration updating process of the pallet management table 30 by the registration updating section 36 shown FIG. 2. When proper color data to be displayed by a CRT or to be printed in color is handled, the operator designates the RGB data within 64 colors which are used as pallet data from 4096 colors as an initial setting. In accordance with an instruction of the RGB data, the first RGB data is input in step S1. The RGB data is held in the input registers 50, 52, and 54 every component and every upper two bits are transferred to the entry register 56, thereby forming an entry number in step S2. On the other hand, in step S3, lower two bits in each of the input registers 50, 52, and 54 are transferred to the data register 58, thereby forming the table data to specify the RGB data. Subsequently, in step S4, the pallet management table 30 is retrieved by the entry number formed in the entry register 56. In step S5, a check is made with respect to the valid bit V in the pallet table entry corresponding to the entry number.

When the valid bit V is reset to 0 (V=0) and it is judged that the designated entry is not yet registered, the processing routine advances to step S6 and the table data in the table register 58 is registered into the pallet management table and the valid bit V is set to 1 (V=1). Subsequently, in step S8, a check is made to see if the registration has been finished or not and the table registration of all of the selected RGB data is executed.

On the other hand, at the time of updating when the RGB data of the registered entry in the pallet management table 30 is changed, the entry number and the table data are formed in a manner similar to the above and the pallet management table is retrieved by the entry number. In this instance, since the valid bit V is set to 1 (V=1) and the updating mode has been set although the entry has already been registered, step S7 follows. The contents of the entry are rewritten by the table data in the data register 58 in this instance and the valid bit V is set to 1 (V=1). The updating of the table data is properly executed by an instruction of the operator as necessary after the registration.

Figure 10:
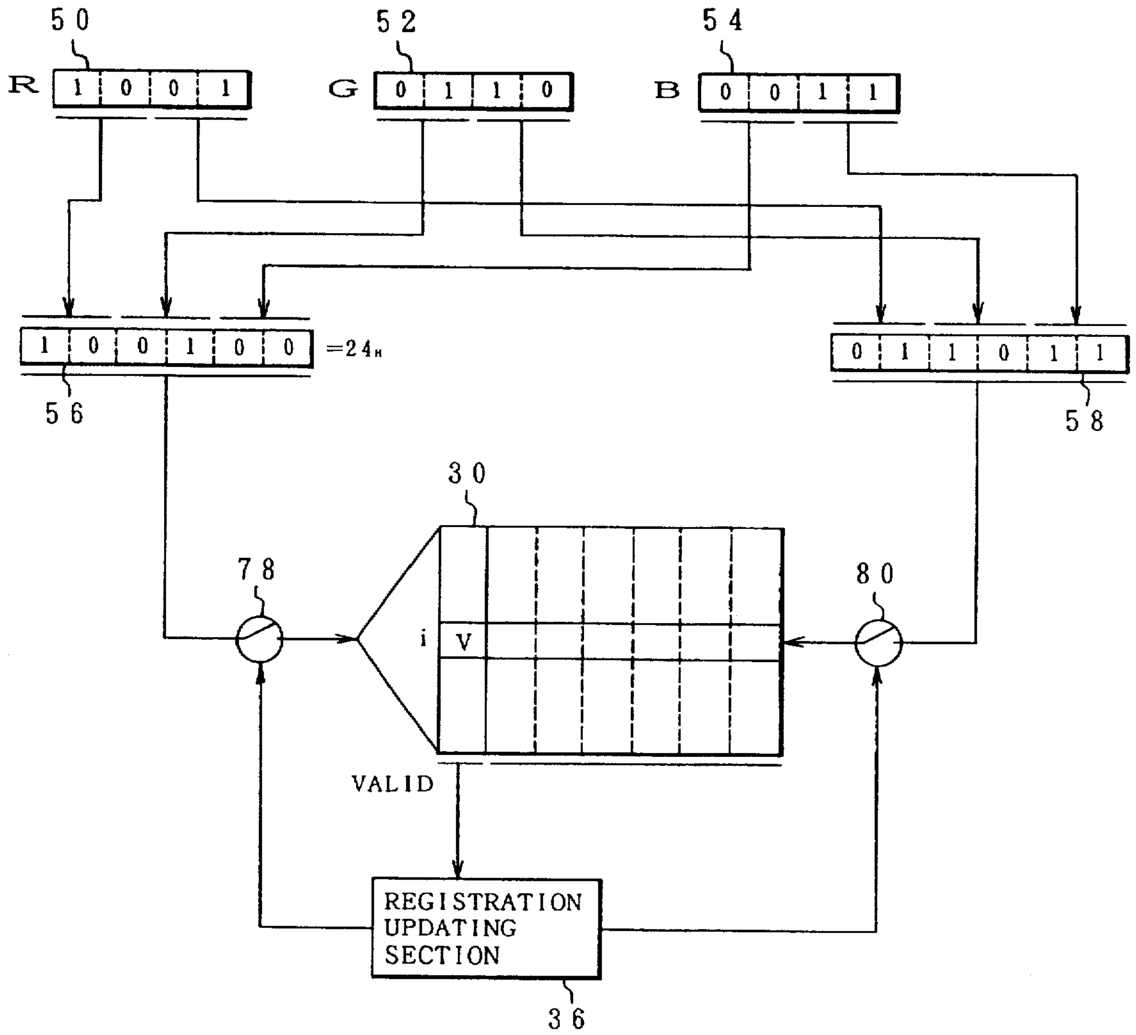
FIG. 10 is a functional block diagram of a registration updating process according to FIG. 9.

FIG. 10 shows processing functions of the registration and updating for the pallet management table of FIG. 9. The entry register 56 forms the entry number from the RGB data which was input to the input registers 50, 52, and 54. The data register 58 also forms the table data. The registration updating section 36 turns on a gate 78, accesses the pallet management table 30 by the entry number in the entry register 56, and reads out the valid bit V in the corresponding table entry. In case of a new registration, since the valid bit V is set to 0 (V=0) and it indicates that the entry is the unregistered entry, a gate 80 is closed and the table data to realize the RGB data formed in the data register 58 is registered into the pallet management table 30, When updating, the processes are also executed in substantially the same manner as the above processes.

Figure 11:
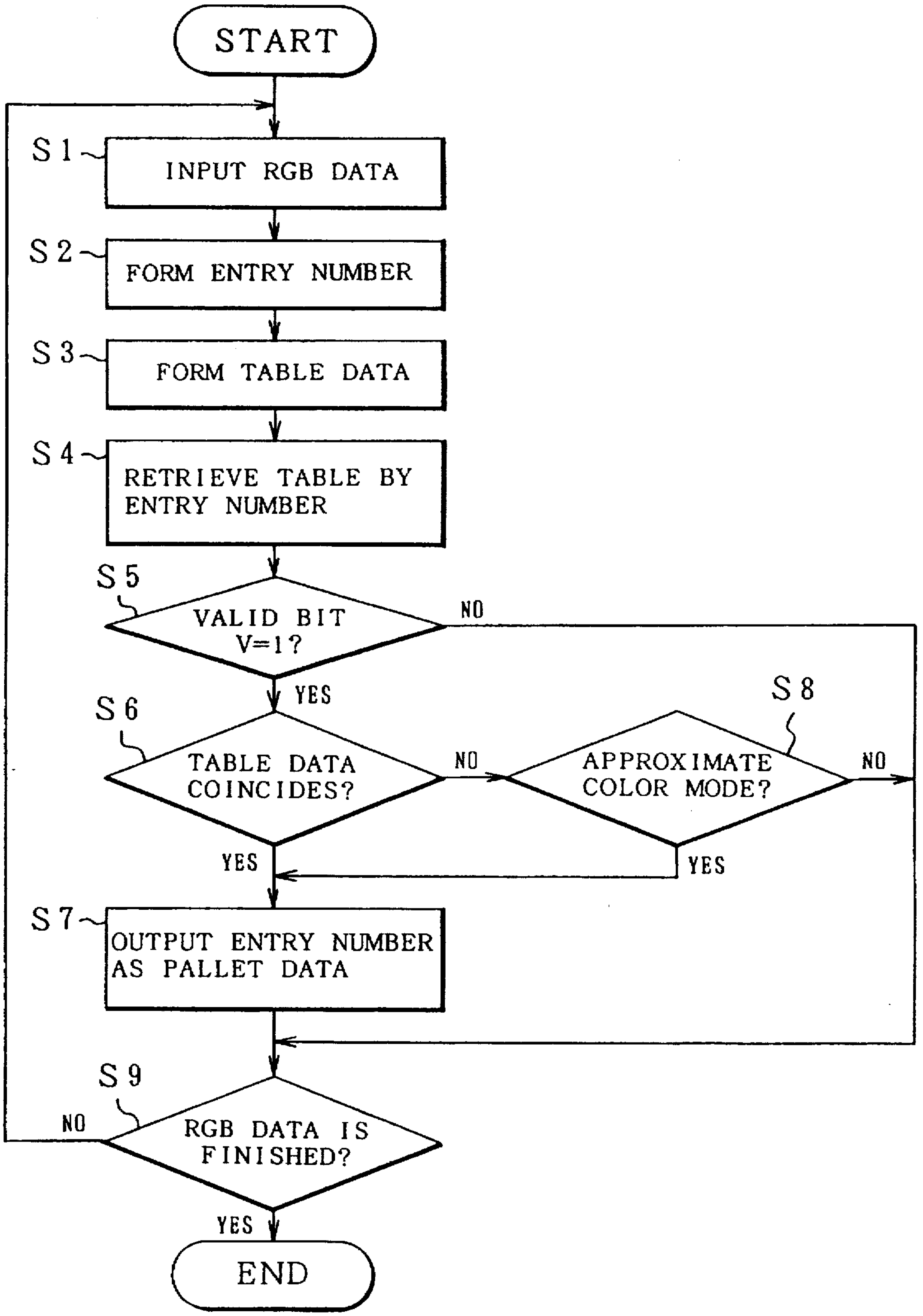
FIG. 11 is a flowchart showing a converting process from the RGB data in FIG. 3 to the pallet data.
Figure 12:
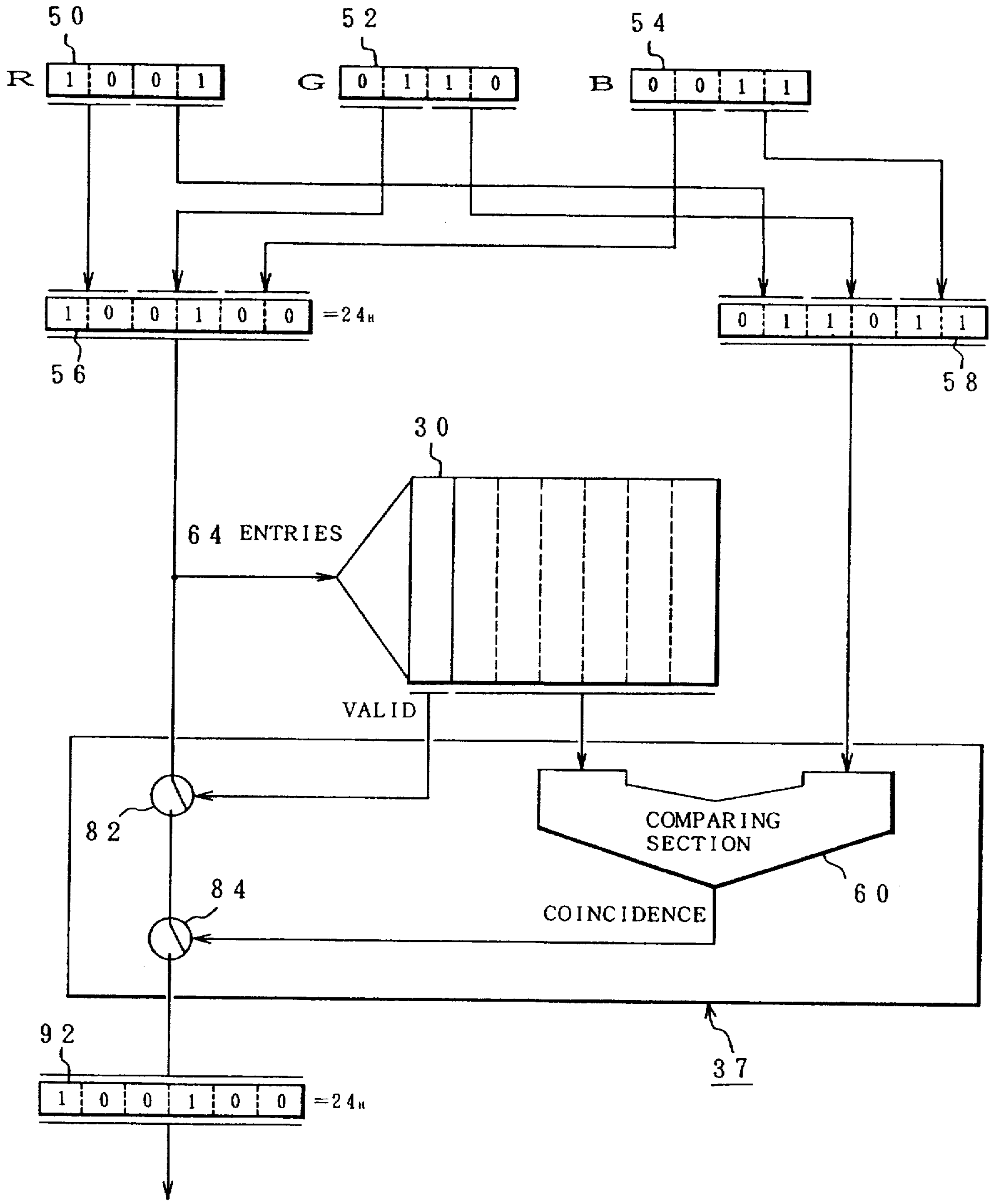
FIG. 12 is a functional block diagram of the converting process according to FIG. 11.

A flowchart of FIG. 11 shows processes to convert the RGB data into the pallet data in the pallet converting mechanism in FIG. 3. A processing function of the converting section is shown in FIG. 12. In FIG. 11, a state in which the registering process for the pallet management table 30 was finished, the RGB data which is used to change the pallet data is input in step S1. Subsequently, in step S2, the entry number is formed from the input RGB data. In step S3, the table data is formed by using the remaining portions of the RGB data used for forming the entry number. In step S4, the pallet management table 30 is retrieved by the entry number. When the valid bit V obtained by the retrieval of the table is set to 1 (V=1) in step S5 and is valid, step S6 follows. The next table data is read out to the comparing section 60 and compared with the table data in the data register 58.

When the table data coincides, the processing routine advances to step S7 and the entry number formed in step S2 is output as pallet data. On the other hand, when the table data doesn't coincide in step S6, the processing routine advances to step S8 and a check is made to see if an approximate color mode has been set or not. When the approximate color mode is set, even if the table data doesn't coincide, the entry number formed in step S2 is output as pallet data in step S7. When the approximate color mode is not set in step S8, the conversion into the pallet data is not executed. In the case where the valid bit V is set to 0 (V=0) and it is unregistered in step S5, the conversion into the pallet data is not executed. The above processes are repeated until the end of the RGB data is judged in step S9.

In FIG. 12, when the valid bit obtained by retrieving the pallet management table 30 is valid, the pallet data converting section 37 turns on a gate 82. When the table data coincides in the comparing section 60, the converting section 37 turns on a gate 84 and transfers the entry number in the entry register 56 to an output register 92 and outputs as pallet data. When the approximate color mode is set, although the result of the comparison by the comparing section 60 denotes the dissidence, the converting section 37 turns on the gate 84 and outputs the entry number as pallet data.

Figure 13:
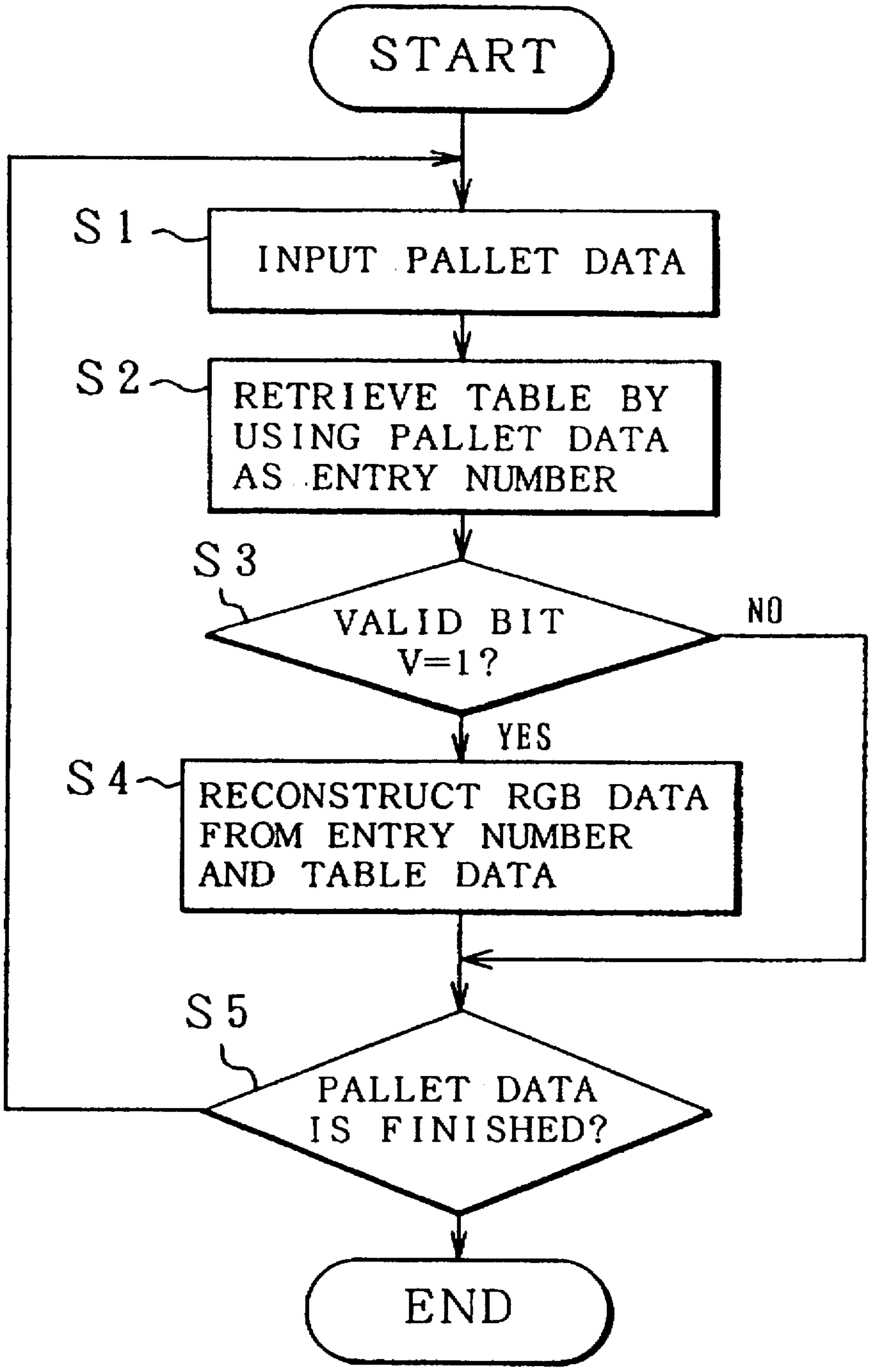
FIG. 13 is a flowchart showing a reverse converting process from the pallet data in FIG. 3 to the RGB data.
Figure 14:
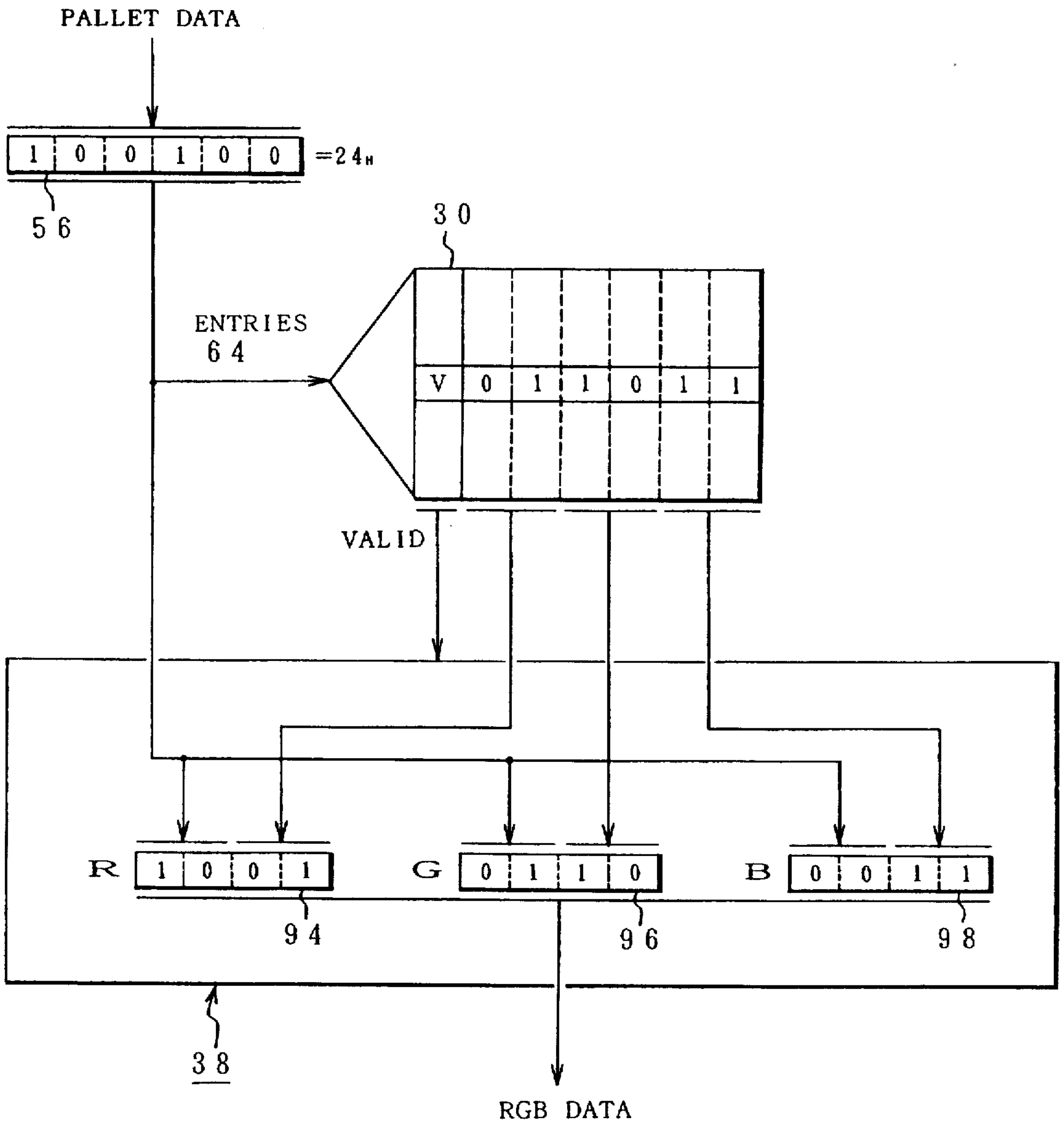
FIG. 14 is a functional block diagram of the reverse converting process according to FIG. 13.

A flowchart of FIG. 13 shows the reverse converting process from the pallet data into the RGB data in the pallet converting mechanism of FIG. 3. FIG. 14 shows a processing function of the reverse conversion. In FIG. 3, the pallet data to be reconstructed is first input to the entry register 56 in step S1. The pallet management table 30 is subsequently retrieved by using the pallet data as an entry number in step S2. The valid bit V is checked in step S3. When the valid bit V is set to 1 (V=1) and is valid, step S4 follows. The original RGB data is reconstructed from the table data registered in the valid entry and the entry number from the entry register 56. The above reconstructing processes are repeated until the pallet data is finished in step S5.

When the valid bit V is found to be valid by retrieving the pallet management table 30 by the pallet data supplied to the entry resistor 56, the pallet data reverse converting section 38 in FIG. 14 reads out the table data subsequent to the valid bit V. Opposite to the data transfer for the entry resister 56 and data resister 58 from the input resisters 50, 52, and 54 shown in FIG. 3, every two bits of the entry number are allocated to each of output resisters 94, 96 and 98 as upper bits and every two bits of the table data from the pallet management table 30 is allocated to each of the resisters 94, 96, and 98 as lower bits, thereby reconstructing the original RGB data and generating.

Figure 15:
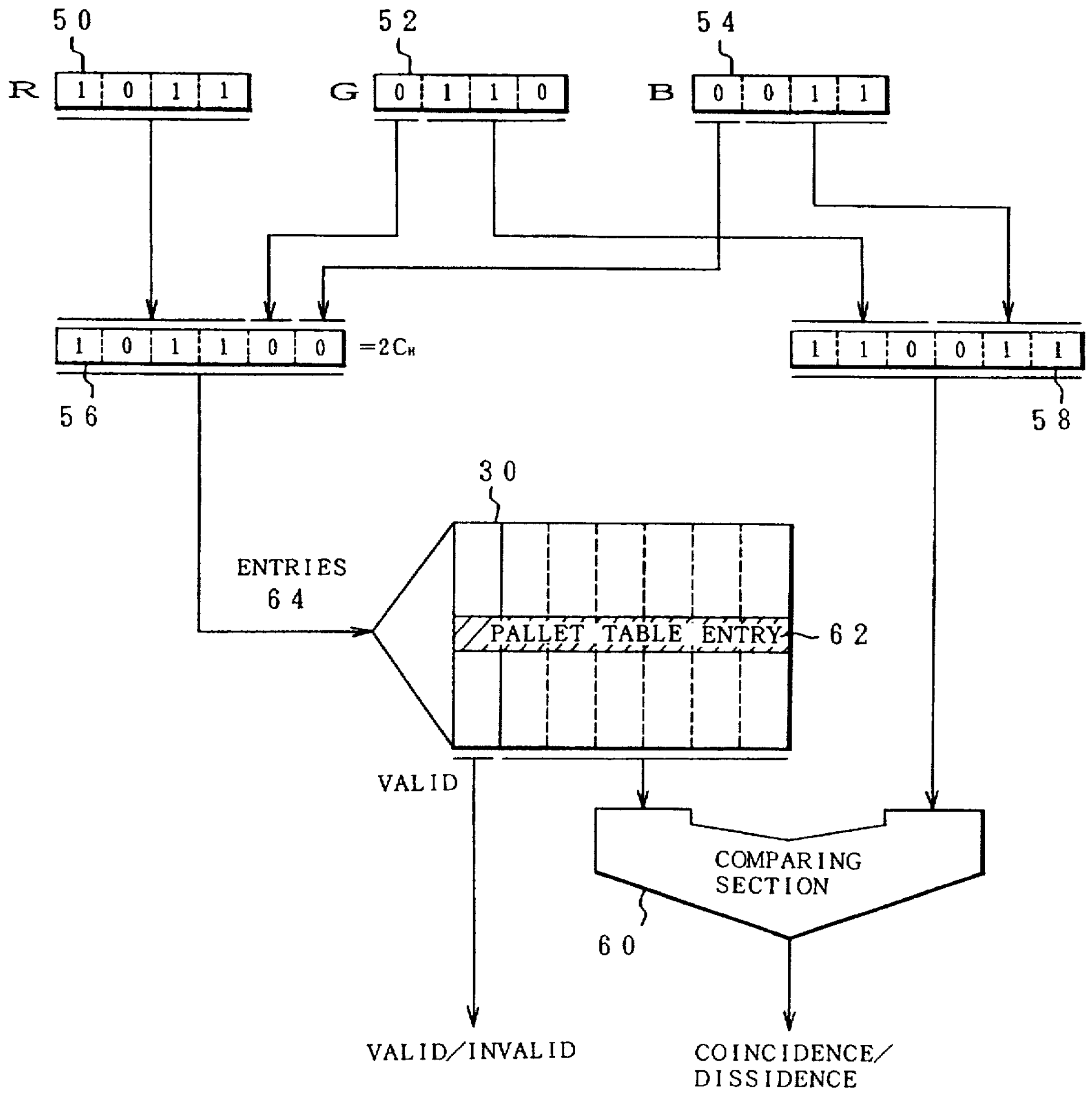
FIG. 15 is a block diagram of a pallet converting mechanism which can finely express an R component.

FIG. 15 shows the second embodiment of the pallet converting mechanism of the invention. It is a feature of the embodiment that with respect to the RGB data held in the input resisters 50, 52, and 54, all of the bits of the R data, one upper bit of the G data, and one upper bit of the B data are input to the entry register 56, thereby forming the entry number of the pallet management table 30. In this case as well, with respect to the data register 58, the combination data of the remaining portions of the RGB data which were not used to form the entry number is produced as table data. That is, 6-bit table data obtained by combining the lower three bits of the G data and the lower three bits of the B data is formed as data to realize the RGB data. A construction of the pallet table entry (PET) 62 of the pallet management table 30 is the same as that of the first embodiment shown in FIG. 3.

FIG. 16 is an explanatory diagram showing a combination of the respective components (decimal values) of the RGB data which are registered in correspondence to the entry numbers 0 to 63 of the pallet management table 30 which is formed in the second embodiment in FIG. 15. In this case, although the R component changes at 16 stages since four bits are allocated to the entry number, the G and B components change at only two stages since only one bit is allocated to the entry number. As a result, in the pallet converting mechanism in FIG. 14, although fairly fine changes can be expressed by the pallet data with respect to the change ratio of the R component, only coarse changes can be expressed by the pallet data with respect to the change ratios of the G and B components. Therefore, by operating the information amount, namely, the number of bits of each of the R, G, and B components which are used to form the entry number, the conversion to the pallet data which enables the detailed reproduction with respect to only the colors in the specific region can be realized.

Figure 17:
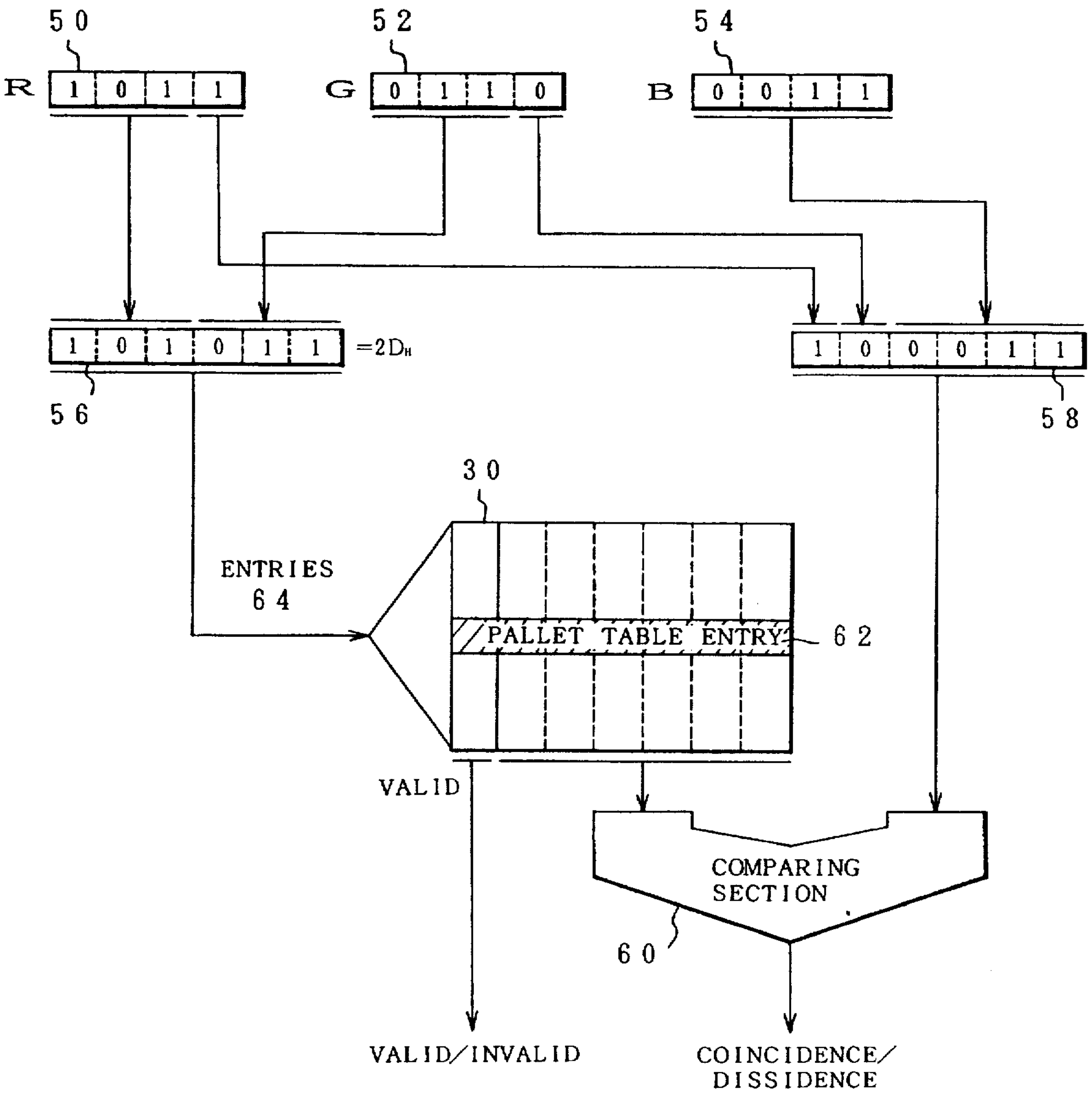
FIG. 17 is a block diagram of a pallet converting mechanism which can express by changing only R and G components.

FIG. 17 shows the third embodiment of the pallet converting mechanism of the invention. It is a feature of the embodiment that a specific component in the R, G, and B components is not used for the formation of the entry number. It is a feature of the embodiment in FIG. 17 that the B component is not used but upper three bits of the R component and upper three bits of the G component are used for the formation of the entry number by the entry register 56. In this case, since the B component is not selected, the B components of all of the entries are constant, namely, equal to 0 in this case. Therefore, the RGB data which can be expressed as pallet data can be limited to the colors of red—orange—yellow—green—green due to only the changes of the R and G components. In such a pallet converting mechanism which doesn't use a specific component in the RGB components for the formation of the entry number, it is also possible to construct the mechanism in a manner such that G or B component other than the B component is not used for the formation of the entry number.

Figure 18:
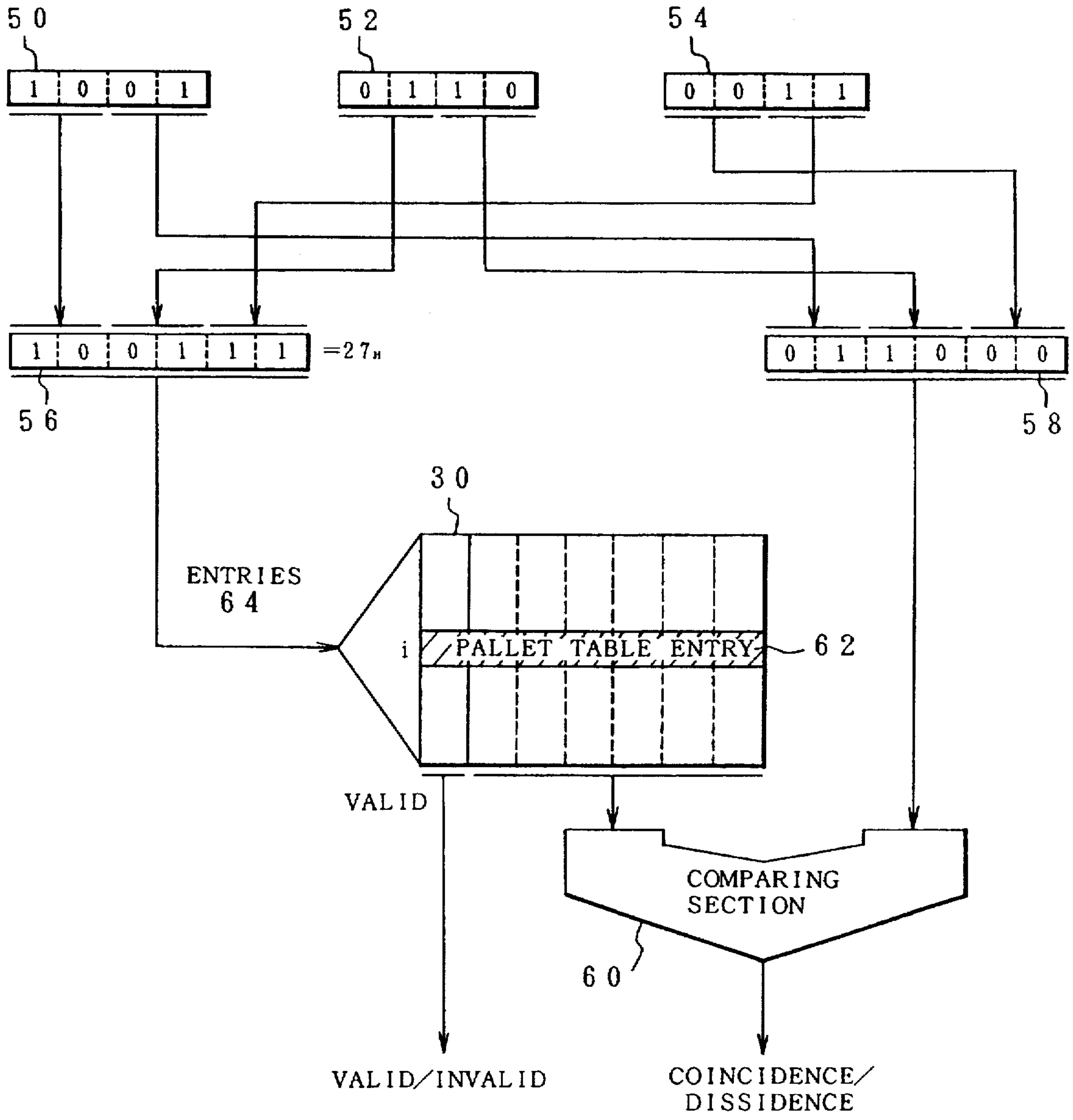
FIG. 18 is a block diagram of a pallet converting mechanism which fetches lower bits of the B component to an entry number.

FIG. 18 shows the fourth embodiment of the pallet converting mechanism of the invention. In the embodiment, the formation of the entry number is not limited to the selection of upper bits of the RGB components. On the basis of a request to express a size at which level and at which extent of fineness, for example, with respect to the R and G components, the entry number is formed by selecting from upper two bits, thereby expressing a wide range of change. On the other hand, with respect to the B component, the conversion to the pallet data which realizes a small amount of change in a narrow range of a specific color hue can be accomplished by selecting lower two bits.

Figure 19:
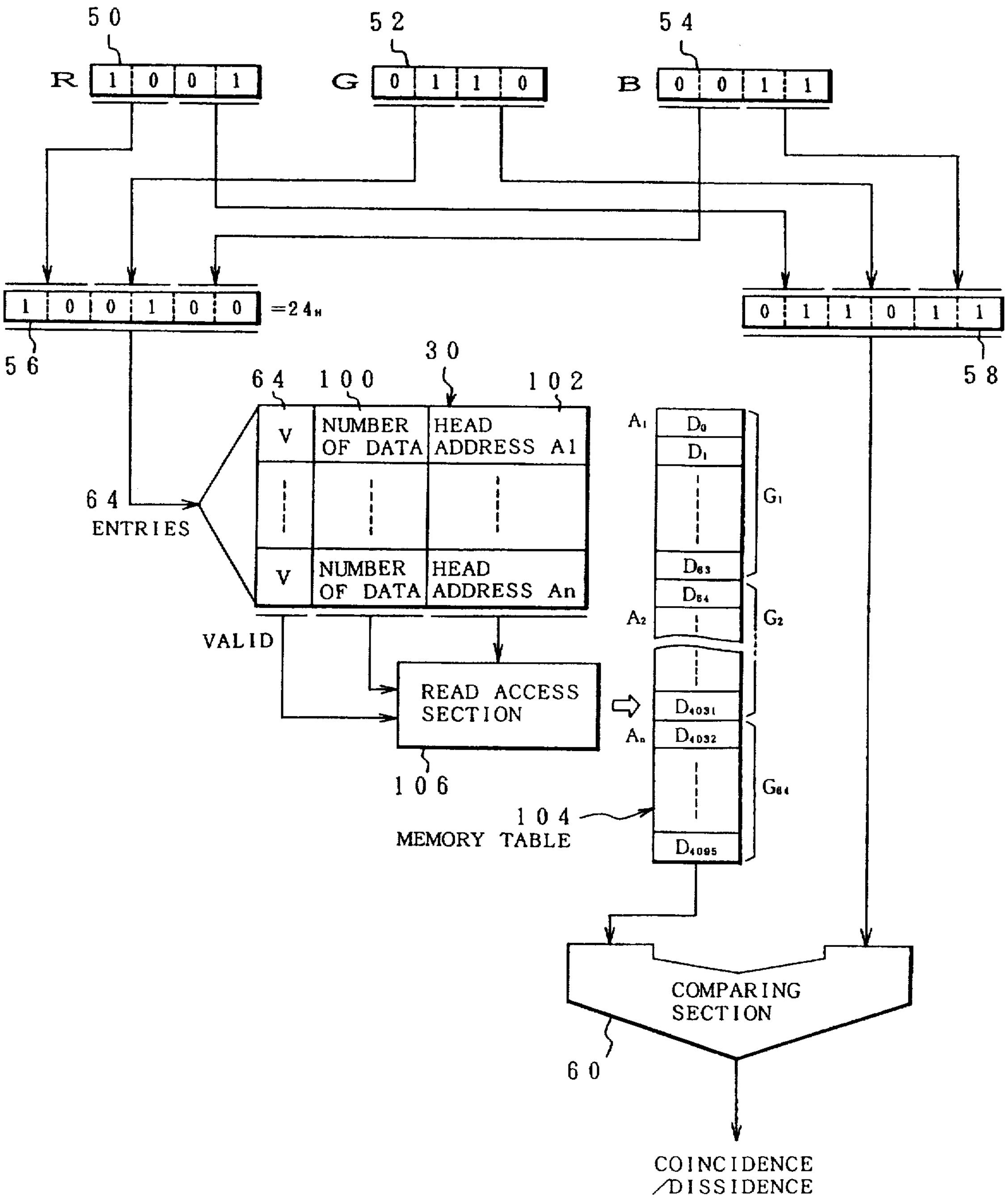
FIG. 19 is a block diagram of a pallet converting mechanism of the invention having a double-table structure.

FIG. 19 shows the fifth embodiment of the pallet converting mechanism of the invention having a double table structure. That is, in the pallet converting mechanism having only the pallet management table 30 mentioned above, only the table data which realizes the RGB data of one color can be obviously registered into one entry. On the other hand, in the pallet converting mechanism in FIG. 19, a memory table 104 as a second table is newly provided in addition to the pallet management table 30 as a first table, thereby making a double-table structure. The entry number for the pallet management table 30 as a first table is formed from upper two bits of each of the RGB data held in the input registers 50, 52, and 54 in a manner similar to the first embodiment in FIG. 3. The table data is formed in the data register 58 by combining the remaining portions of the RGB data used in the formation of the entry number. Three information of the valid bit 64, the number of data 100, and a head address 102 are registered in each entry of the pallet management table 30.

On the other hand, 4096 colors in the RGB space are classified to 64 groups $G_1$ to $G_{64}$ in correspondence to 64 kinds of entry numbers formed by the entry register 56 and table data formed by using the data register 58 with respect to the RGB data of each group is stored into the memory table 104 as the second table on a group unit basis. The table data registered in the RGB data of 4096 colors are indicated as D00 to D4095. The table data D00 to D63 are stored as a first group G1. In a manner similar to the above, the table data D4032 to D4095 are stored as a last 64th group. Head addresses A1, A2, *, An of the table data of each group in the table memory 104 are registered as a head address 102 of the pallet management table 30**.

When the RGB data is converted to the pallet data, a read access section 106 obtains the number of data and the head address by retrieving the pallet management table 30 by the entry numbers formed by the entry register 56, reads the table data in the memory table 104, and supplies to a comparing section 60. When the read data of the memory table 104 and the table data which is outputted from the data register 58 at that time coincide, the comparing section 60 outputs the entry number of the entry register 56 as pallet data. In case of the reverse conversion to reconstruct the RGB data from the pallet data, the read access section 106 also accesses the memory table 104.

Figure 20:
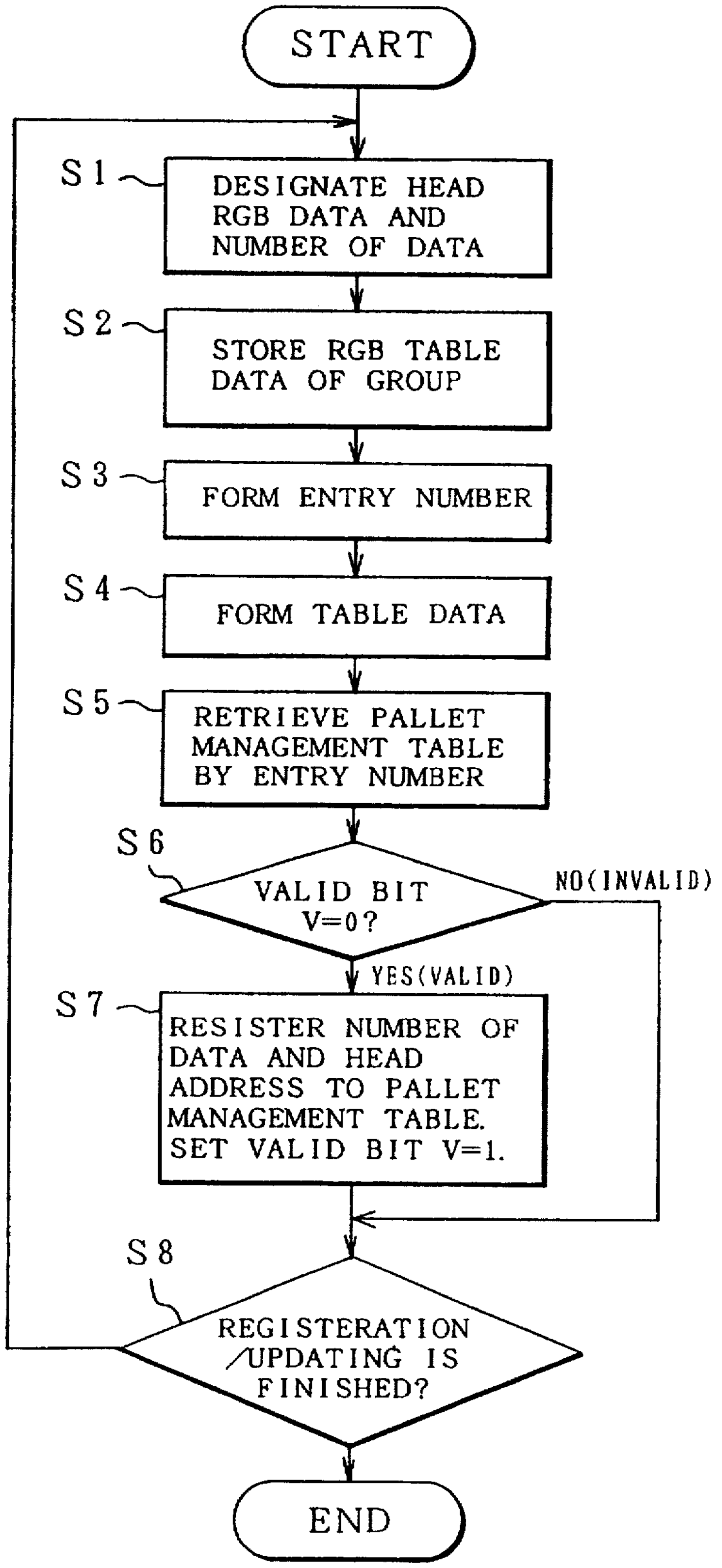
FIG. 20 is a flowchart showing a registration updating process in FIG. 19.

The flowchart of FIG. 20 shows a registration updating process in the address converting mechanism using the double-table structure in FIG. 19. In step S1, the total number 4096 of colors in the RGB space is divided by the number 64 of entries of the pallet management table 30, thereby obtaining the number 64 of data of every group, and the head address in the memory table 104 and the number of data are designated. Subsequently, in step S2, the table data formed from the RGB data of each group is loaded into the memory table 104. The RGB data of the head address of each group is input as registration data. In step S3, the entry number is formed. And the table data is formed in step S4. The table data is not particularly used in the registration. The pallet management table is retrieved by the entry number in step S5. The processing routine advances to step S7 under the condition that the valid bit V is not registered, that is, the valid bit V=0 in step S6. In step S7, the number of data and the head address are registered into the designated entry and the valid bit is set to V=1. The above processes are repeated until the registration or updating is finished in step S9. With respect to the updating of the table contents, since the number of groups is decided, the range of the RGB data to be used in one group is changed. With respect to the change of the use range of the RGB data in the group, it is sufficient to execute the updating process to rewrite a head address 102 or data number 100 of each group.

Figure 21:
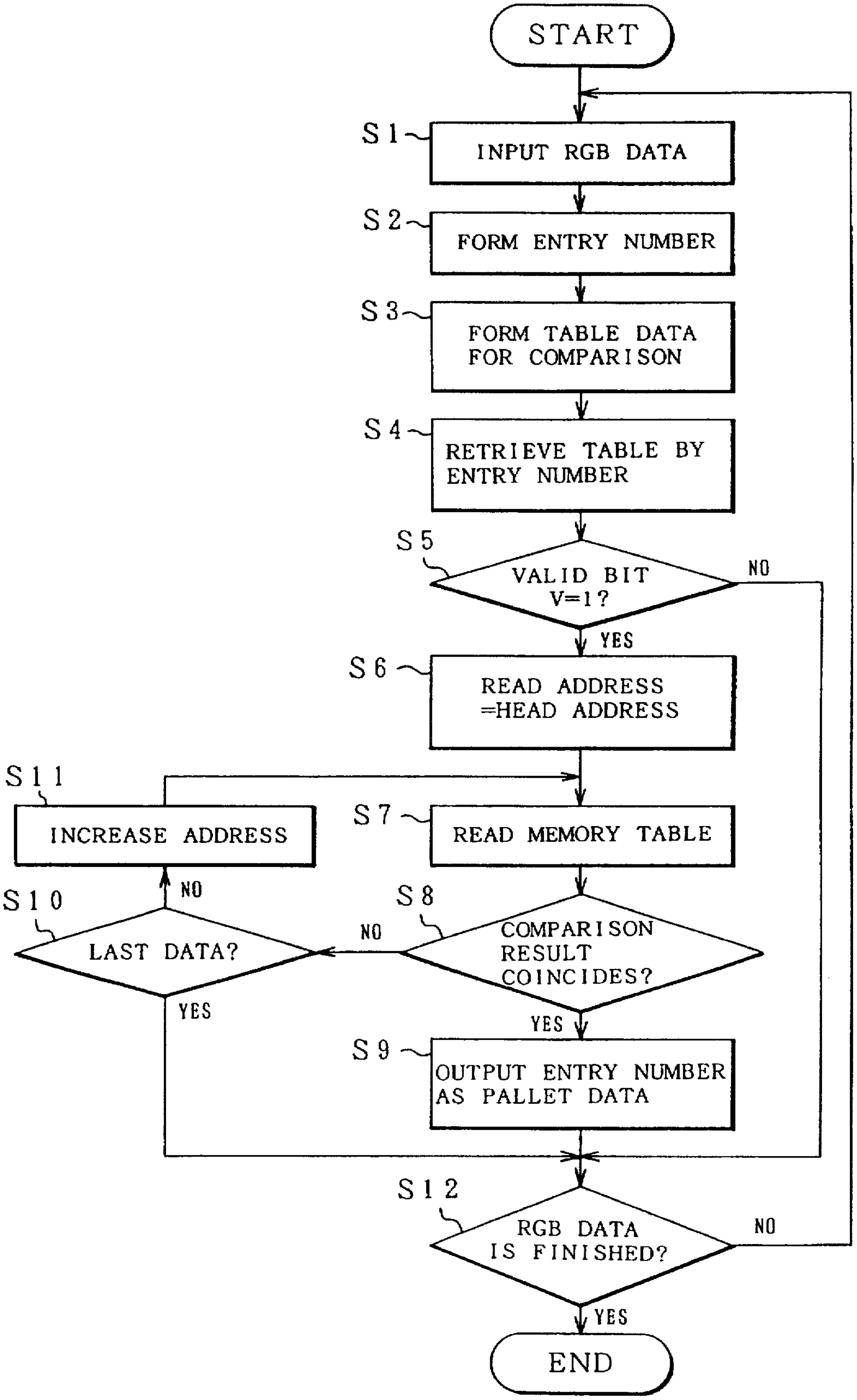
FIG. 21 is a flowchart showing a converting process in FIG. 19.

A flowchart of FIG. 21 shows a converting process from RGB data to pallet data in the pallet converting mechanism having the double-table structure in FIG. 19. In step S2, the entry number is formed from, for example, the upper two bits of the RGB component. The table data for comparison is also formed in step S3. The pallet management table is retrieved by the entry number formed in step S4 and the head address obtained by the table retrieval is set into the read address in step S6 under a condition such that the valid bit is effective (V=1). Subsequently, in step S7, the table data is read out by reading the memory table 104 in which the read address was designated. In step S8, the table data for comparison formed in step S3 and the table data read out from the memory table 104 are compared. When they don't coincide, a check is made to see if the data is the final data based on the number of data or not in step S10. The reading operation of the memory table in step S7 is repeated by increasing the address one by one in step S1 until the data becomes the final data. When the coincidence of the table data is judged by the comparing section 60 during the above reading operation, the entry number of the entry register 56 at this time is output as pallet data in step S9. The above processes are repeated until the RGB data finishes in step S12.

Figure 22:
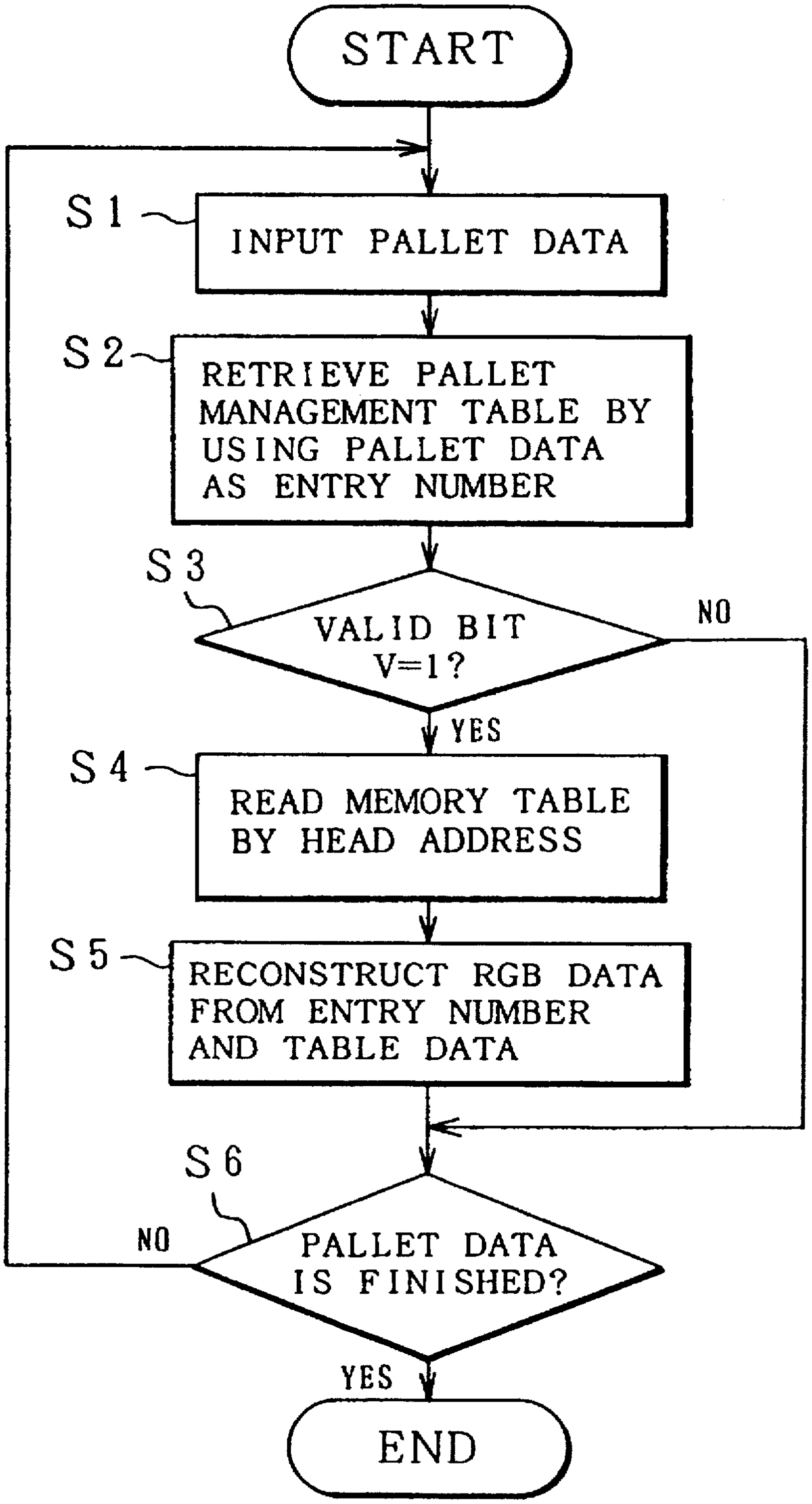
FIG. 22 is a flowchart showing a reverse converting process in FIG. 19.

A flowchart of FIG. 22 shows processes for reversely converting the pallet data to the original RGB data in the pallet converting mechanism in FIG. 19. In step S1, the pallet data is input to the entry register 56. In step S2, the pallet management table 30 is retrieved by using the pallet data as an entry number. When the valid bit V obtained by the retrieval is effective (V=1), the memory table 104 is read by the head address obtained by the table retrieval and the table data in the head address is obtained in step S4.

Subsequently, the RGB data is reconstructed by a combination opposite to that in the case of the entry number and the table data in FIG. 19 from the entry number and the table data obtained from the memory table 104. The above processes are repeated until the pallet data finishes in step S6. In this case, all of the pallet data of the RGB data belonging to one group are reconstructed as same RGB data based on the table data stored in the group head address of the memory table 104.

Figure 23:
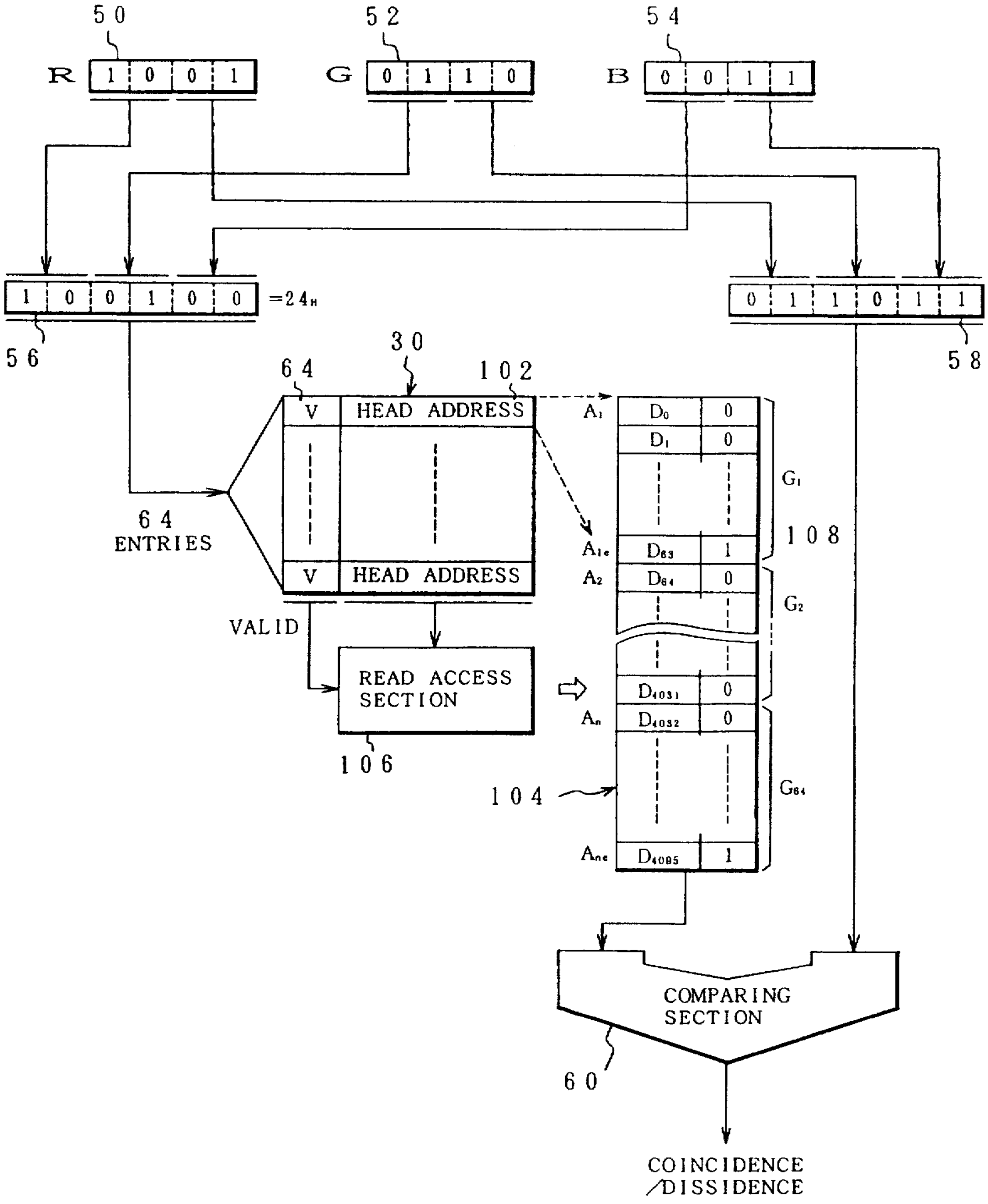
FIG. 23 is a block diagram of a pallet converting mechanism having a double-table structure using a termination flag instead of the number of data.

FIG. 23 shows a modification of the address converting mechanism in FIG. 19. In the embodiment, the number 100 of data is not stored into the pallet management table 30 but a terminate flag 108 is provided to each table data which is stored into the memory table 104 and the terminate flags of the final table data D63, *, D4031, D4095 of the table data of each group are set to "1", thereby indicating the end positions of the groups. Therefore, the read access section 106 starts the reading operation of the table data of the specific group from the memory table 104 by the designation of the head address. When it is judged that the terminate flag 108 of the read data has been set to "1", it is judged as final table data and the reading operation is finished. By adding the terminate flag to such table data which is stored into the memory table 104, the construction of the pallet management table 30** can be simplified.

Figure 24:
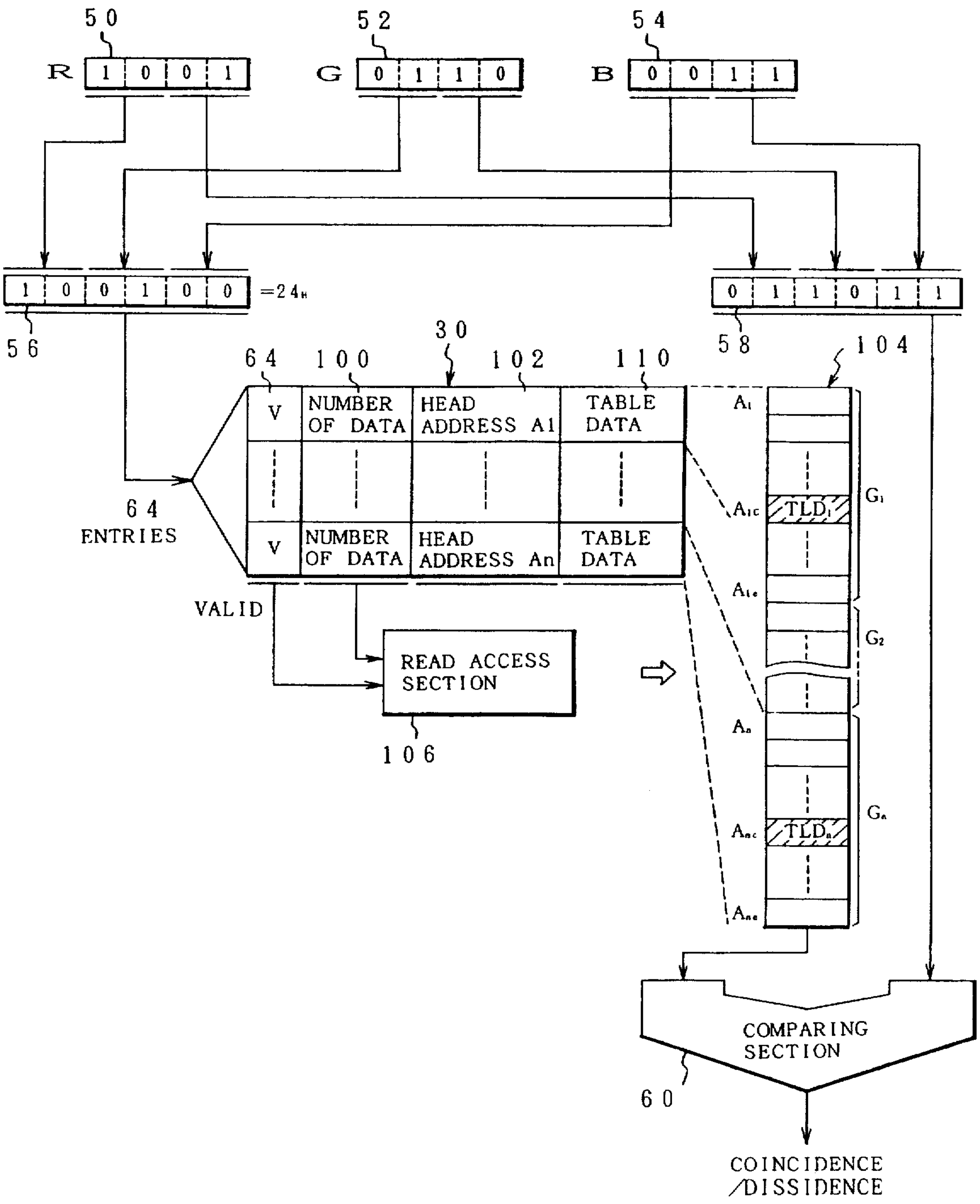
FIG. 24 is a block diagram of a pallet converting mechanism having a double-table structure which can arbitrarily designate RGB data to be reconstructed.

FIG. 24 shows another modification of the pallet converting mechanism in FIG. 19. That is, in the pallet converting mechanism in FIG. 19, with respect to the reverse conversion from the pallet data to the RGB data, only the RGB data which is realized by the table data stored in the head address of each group in the memory table 106 which is designated by the head address in the pallet management table 30 can be reconstructed. On the other hand, in the embodiment of FIG. 24, arbitrary RGB data included in each of the groups $G_1$ to Gn registered in the memory table 104 can be reconstructed from the pallet data. Consequently, table data 110 is newly stored into the pallet management table 30. The RGB data which is used to reconstruct is designated from the RGB data belonging to the self group as table data 110. The values of table data $TLD_1$ to $TLD_n$ shown by hatched portions corresponding to the designated RGB data are preliminarily registered. For example, the reconstruction RGB data of each group shown by the hatched portion is designated so as to indicate the central color.

The conversion from the RGB data to the pallet data in the embodiment of FIG. 24 is the same as that of the embodiment of FIG. 19. In the reverse conversion from the pallet data to the RGB data, the table data 110 obtained by the retrieval of the pallet management table 30 by the entry numbers formed is directly used and the RGB data is reconstructed by adding the table data 110 to the entry number without reading the memory table 104.

By the above processes, the reverse conversion to the necessary specific RGB data among the RGB data belonging to the group can be realized by the pallet data to design a group. With respect to the embodiment in FIG. 24, it is also possible to add the terminate flag 108 to the memory table 104 side in place of the data number of the pallet management table 30 in a manner similar to the embodiment in FIG. 23.

The above embodiments have been described as an example with respect to the case where 4096 kinds of RGB data which are expressed by 12 bits by using upper bits of each component of RGB are used as target and converted into the 64 kinds of pallet data by the pallet management table having 64 entries. However, the number of bits of each component of RGB and the number of bits of the entry number in the pallet management table can be properly set as necessary. It is sufficient to determine in a manner such that the number of bits of the pallet data is smaller than the number of bits of the color data in the color space.

Although the above embodiments have been described as an example with respect to the case where the color space is the RGB space, the invention can be also realized in substantially the same manner with regard to the other color spaces. For example, a CMYK space adapted to a printer apparatus, an RGB space which is applied to a CRT display apparatus, an XYZ space prescribed by JIS Z8701 which doesn't depend on the apparatus, or an L* a* b * space or L* u* v* space specified in JIS Z8729 can be also applied. Further, by realizing an HSB space or HSV space which is known as a color space reflecting the human perception of the color and is a space to express three components of hue, saturation, and brightness as a target, the processes of various kinds of color data using the pallet data to realize more natural changes for the human perception can be realized.

Further, in the pallet converting mechanism of the invention, processes by either a software or a hardware can be executed.

According to the invention mentioned above, the unnecessary table access at the time of registration and updating of the table which is used to convert the color data of a predetermined color space to the pallet data can be prevented, so that a reduction of the processing time and a high efficiency of the processing procedure can be realized.

The processes for the color region such as additional registration of the color data which has already been registered into the pallet table, conversion from the approximate color data to the pallet data, and the like can be fairly easily executed.

Further, the conversion and reverse conversion from the color data to the pallet data are not limited to the color space but the pallet conversion and reverse conversion are realized for a proper color space such as color space which can be expressed by the apparatus, color space which cannot be expressed by the apparatus, color space which is fitted to the human color perception, or the like, so that a high efficiency and a high speed of the data processes in each space can be realized.

What is claimed is:

1. A method managing a plurality of color data in a predetermined color space, each color data having multiple data components, comprising:

an entry number forming step of combining data components of a color data selected from the plurality of color data and forming an entry number of a table having a data length shorter than that of the color data;

a table data forming step of combining the remaining data components of the color data which are not used for the formation of said entry number and forming a table data;

a table registration updating step of updating a table entry of said table by storing said table data at a table position corresponding to said entry number and setting a validity indicator indicative of the validity of the table entry;

a converting step of converting the color data of said color space to a corresponding plurality of pallet data by retrieving the table entry corresponding to the entry number formed from data components of said color data, and outputting said entry number as said pallet data when the table data obtained by said retrieval coincides with the table data formed from the remaining data components of said color data not used to form said entry number; and a reverse converting step of converting said pallet data to said color data by retrieving the table entry corresponding to said pallet data and reconstructing said color data from said pallet data and the table data of said table entry obtained by said retrieval.

2. A method according to claim 1, wherein said color space is a color space which can be generated and expressed by a first apparatus and is converted to a color space expressible by a second apparatus when said color space is expressed by said second apparatus.

3. A method according to claim 2, wherein said color space is at least one of a color space for displaying on a display, a color space for printing, and a color space which is equivalent to the human perception of color.

4. An apparatus managing a plurality of color data in a predetermined color space, each color data having multiple data components, comprising:

table means storing a plurality of table entries accessible by an entry number and having a length shorter than the length of the color data, each table entry having a validity indicator indicative of the validity of said table entry and table data, wherein color data is represented by said entry number and said table data of a table entry;

entry number forming means for forming the entry number of said table means by combining data components of a color data selected from said plurality of color data;

table data forming means for forming the table data by combining remaining data components of color data not used for the formation of said entry number;

table registration updating means for newly registrating or updating said table means with a table entry corresponding to said entry number;

converting means for converting said color data in said color space to a corresponding plurality of pallet data expressed by the entry number of said table means; and reverse converting means for converting said pallet data to said color data in said color space.

5. An apparatus according to claim 4, wherein said entry number forming means forms the entry number of said table means by at least one of the following combinations:

a combination of upper bits of a plurality of components constructing said color data;

a combination of the same number of upper bits with respect to a plurality of components constructing said color data;

a combination of different number of upper bits with respect to a plurality of components constructing said color data;

a combination of only the upper bits of a specific component among a plurality of components constructing said color data; and a combination of upper and lower bits of a specific component among a plurality of components constructing said color data.

6. An apparatus according to claim 4, wherein said table registration updating means comprises:

retrieving means for retrieving said table entry by the entry number formed by said entry number forming means;

judging means for judging the validity of the entry from the validity indicator obtained by said retrieving means;

comparing means for comparing the table data obtained by said retrieving means and the table data formed by said table data forming means; and registering means for registering the table entry when said judging means judged that the table entry is not valid.

7. An apparatus according to claim 4, wherein said converting means comprises:

retrieving means for retrieving said table entry by the entry number formed by said entry number forming means;

judging means for judging the validity of the table entry from the validity indicator obtained by said retrieving means;

comparing means for comparing the table data obtained by said retrieving means and the table data formed by said table data forming means; and outputting means for converting said entry number to pallet data and outputting said pallet data said judging means judged that the table entry is valid and the coincidence of the table data is decided by said comparing means.

8. An apparatus according to claim 4, wherein said reverse converting means comprises:

retrieving means for retrieving said pallet data and retrieving said table entry by using said pallet data as the entry number; and color data outputting means for reconstructing the original color data from said table data retrieved by said retrieving means and said pallet data and outputting said original color data.

9. An apparatus according to claim 4, wherein said color space can be outputted and expressed by a first apparatus and, when the color space is expressed by another apparatus, said color space is converted to a color space which can be expressed by said second apparatus.

10. An apparatus according to claim 9, wherein said color space is at least one of a color space for displaying by a display, a color space for printing, and a color space which is equivalent to the human perception of color.

11. A method managing a plurality of color data in a predetermined color space, each color data having multiple data components, comprising:

an entry number forming step of making a group of a subset of said plurality of color data and forming an entry number from data components of color data to a first table entry of a first table, said entry number being common to said group of color data and having a data length shorter than that of one of said plurality of color data;

a table data forming step of combining remaining data components of color data which are not used for the formation of said entry number and forming table data which is stored into a second table;

a memory table storing step of storing the table data formed by said table data forming step with respect to said group of color data into said second table on a group unit basis;

a first table registration updating step of designating a first table entry of said first table by the entry number which is common to said group of color data and storing a validity indicator indicative of the validity of the table entry, a number of color data of the group and a head storing position of said second table of the group of color data;

a converting step of converting said color data of said color space to a corresponding plurality of pallet data by sequentially reading out the table data for only the number of color data starting from the head storing position in the second table identified by a first table entry corresponding to the entry number formed from data components of said color data and outputting said entry number as pallet data when the table data produced from the remaining data components of said color data coincides with the read-out table data; and a reverse converting step of converting said pallet data to said color data by retrieving a first table entry and outputting the color data at the head storing position in said second table identified by said first table entry as reconstructed color data.

12. A method according to claim 11, wherein an arbitrary one of the table data stored in said second table on a group unit basis is further registered into said first table and, when said pallet data is reversely converted to the color data, specific color data in the group is reconstructed from the table data registered in said first table and the entry number.

13. A method according to claim 11, wherein said color space is a color space which can be outputted and expressed by a first apparatus and, when said color space is expressed by a second apparatus, said color space is converted to a color space which can be expressed by said second apparatus.

14. A method according to claim 13, wherein said color space is at least one of a color space for displaying by a display, a color space for printing, and a color space which is equivalent to the human perception of color.

15. An apparatus managing a plurality of color data in a predetermined color space, each color data having multiple data components, comprising:

entry number forming means for making a group of a subset of said plurality of color data and forming an entry number from data components of color data, said entry number being common to said group of color data and having a data length shorter than that of one of said plurality of color data;

table data forming means for forming table data combining remaining data components of color data which are not used for the formation of said entry number;

second table means for storing the table data formed by said table data forming means on a group unit basis with respect to said group of color data;

first table means for storing a validity indicator indicative of the validity of the table entry, a number of color data of the group, and a head storing position in said second table means of the group of color data, to a first table entry designated by the entry number which is common to said group of color data;

table registration updating means for executing a new registration or updating of said first table means on the basis of the color data of the group unit selected from said color space;

converting means for converting said color data of said color space to a corresponding plurality of pallet data expressed by the entry number; and reverse converting means for converting said pallet data to said color data and reconstructing the color data of said color space.

16. An apparatus according to claim 15, wherein said converting means comprises:

retrieving means for retrieving a first table entry of said first table means by the entry number formed from said color data by said entry number forming means;

reading means for sequentially reading out table data for only the number of color data starting from the head storing position in said second table means identified by said first table entry retrieved by said retrieving means;

comparing means for comparing the table data read out by said reading means and the table data formed from said color data; and outputting means for converting and outputting said entry number as pallet data when a coincidence output is obtained said comparing means.

17. An apparatus according to claim 15, wherein said reverse converting means comprises:

retrieving means for retrieving said pallet data and retrieving a first table entry of said first table means using said pallet data as the entry number;

reading means for reading out the table data at the head storing position in said second table means identified by said first table entry retrieved by said retrieving means; and reconstructing means for reconstructing and outputting said color data from the read-out table data by said reading means and said pallet data.

18. An apparatus according to claim 15, wherein an arbitrary one of the table data stored in said second table means on a group unit basis is further registered into said first table means and, when said pallet data is reversely converted to the color data, specific color data in the group is reconstructed from the table data registered in said first table and the entry number.

19. An apparatus according to claim 15, wherein said color space is a color space which can be outputted and expressed by a first apparatus and, when the color space is expressed by a second apparatus, said color space is converted to a color space which can be expressed by said second apparatus.

20. An apparatus according to claim 19, wherein said color space is at least one of a color space for displaying by a display, a color space for printing, and a color space which is equivalent to the human perception of color.

21. A method managing color data having multiple components comprising:

an entry number forming step of making a group of a subset of said plurality of color data and forming an entry number from data components of color data, said entry number being common to the group of color data and having a data length shorter than that of one of said plurality of said color data;

a table data forming step of combining remaining data components of color data which are not used for the formation of said entry number and forming table data;

a second table storing step of storing the table data formed by said table data forming step with respect to said group of color data into a second table on a group unit basis and also adding a terminate code indicative of the last position of the group data;

a first table registration updating step of designating a first table entry in a first table by the entry number which is common to said group of color data and storing into said first table entry a validity indicator indicative of the validity of said first table entry and a head storing position in said second table of the group of color data;

a converting step of converting said color data of said color space to a corresponding plurality of pallet data by accessing an initial table data stored in said second table identified by said head position obtained from a first table entry identified by said entry number, sequentially reading out table data until said terminate code is encountered in said second table and converting and outputting the entry number as pallet data when the table data produced from said color data coincides with the read-out table data; and a reverse converting step of converting said pallet data to said color data by retrieving a first table entry, and outputting the color data at the head storing position in said second table identified by said first table entry as reconstructed color data.

22. A method according to claim 21, wherein an arbitrary one of the table data stored in said second table on a group unit basis is further registered into said first table and, when said pallet data is reversely converted to the color data, specific color data in the group is reconstructed from the table data registered in said first table and the entry number.

23. A method according to claim 21, wherein said color space is a color space which can be outputted and expressed by a first apparatus and, when the color space is expressed by a second apparatus, said color space is converted to a color space which can be expressed by said second apparatus.

24. A method according to claim 23, wherein said color space is at least one of a color space for displaying by a display, a color space for printing, and a color space which is equivalent to the human perception of color.

25. An apparatus managing a plurality of color data in a predetermined color space, each color data having multiple data components, comprising:

entry number forming means for making a group of said plurality of color data and forming an entry number, from data components of color data, which is common to said group of color data and has a data length shorter than that of each of said color data;

table data forming means for combining remaining data components of color data which are not used for the formation of said entry numbers and are peculiar to each of said color data, thereby forming table data;

second table means which stores on a group unit basis the table data formed by said table data forming means with respect to said group of color data and in which a terminate code is added to the last position of the group data;

first table means storing a validity indicator indicative of the validity of the table entry and a head storing position in said second table means of said group of color data at a first table entry designated by the entry number which is common to said group of color data;

table registration updating means for executing a new registration or updating of said first table means on the basis of the color data of the group unit selected from said color space;

converting means for converting said color data of said color space to a corresponding plurality of pallet data expressed by the entry number; and reverse converting means for converting said pallet data to said color data and reconstructing the color data of said color space.

26. An apparatus according to claim 25, wherein said converting means comprises:

retrieving means for retrieving a first table entry of said first table means by the entry number formed by said color data by said entry number forming means;

reading means for sequentially reading out table data until a terminate code is encountered in said second table means identified by said first table entry retrieved by said retrieving means;

comparing means for comparing the table data from said reading means and the table data formed from said color data; and output means for converting and outputting said entry number as pallet data when a coincidence output is obtained by said comparing means.

27. An apparatus according to claim 25, wherein said reverse converting means comprises:

retrieving means for retrieving said pallet data and retrieving a first table entry of said first table means using said pallet data as the entry number;

reading means for reading out the table data at the head storing position in said second table means identified by said first table entry retireved by said retrieving means; and reconstructing means for reconstructing and outputting said color data from the read-out table data by said reading means and said pallet data.

28. An apparatus according to claim 25, wherein an arbitrary one of the table data stored in said second table means on a group unit basis is further registered into said first table means and when the input pallet data is reversely converted to the color data, specific color data in the group is reconstructed from the table data registered in said first table means and the entry number.

29. An apparatus according to claim 25, wherein said color space is a color space which can be outputted and expressed by a first apparatus and, when said color space is expressed by a second apparatus, said color space is converted to a color space which can be expressed by said second apparatus.

30. An apparatus according to claim 29, wherein said color space is at least one of a color space for displaying by a display, a color space for printing, and a color space which is equivalent to the human perception of color.

31. A device managing a plurality of color data in a predetermined color space, each color data having multiple data components, comprising:

a table storing device storing a table having a plurality of table entries, each table entry, having a validity indicator and a table data, accessible by an entry number, wherein said entry number and said table data each having a data length less than the data length of one of said plurality of color data;

an entry number forming device forming an entry number, by combining data components of one of said plurality of color data;

a table data forming device forming said table data corresponding to said entry number by combining the remaining data components of color data which are not used for the formation of said entry number;

a table registration updating device registering said table data into the table entry corresponding to said entry number, and setting the validity indicator of said table entry to indicate the validity of said table entry;

a converting device converting color data into pallet data by retrieving the table entry corresponding to the entry number formed from data components of one of said plurality of color data and outputting said entry number as pallet data when the table data of said table entry coincides with the table data formed from the remaining data components of said one of said plurality of color data not used in forming said entry number; and a reverse converting device converting pallet data into color data by retrieving the table entry corresponding to said pallet data and reconstructing color data from said pallet data and the table data of said table entry.

32. A method of managing a plurality of color data in a predetermined color space, each color data having multiple data components, comprising the steps of:

storing a table having a plurality of table entries, each table entry, having a validity indicator and a table data, accessible by an entry number, wherein said entry number and said table data each having a data length less than the data length of one of said plurality of color data;

forming an entry number, by combining data components of one of said plurality of color data;

forming a table data corresponding to said entry number by combining the remaining data components of color data which are not used for the formation of said entry number;

registering and updating said table data into the table entry corresponding to said entry number, and setting the validity indicator of said table entry to indicate the validity of said table entry;

converting color data into pallet data by retrieving the table entry corresponding to the entry number formed from data components of one of said plurality of color data and outputting said entry number as pallet data when the table data of said table entry coincides with the table data formed from the remaining data components of said one of said plurality of color data not used in forming said entry number; and reconverting pallet data into color data by retrieving the table entry corresponding to said pallet data and reconstructing color data from said pallet data and the table data of said table entry.

33. A device managing a plurality of color data in a predetermined color space, each color data having multiple data components, comprising:

a table storing device storing a table having a plurality of table entries, each table entry, having a validity indicator and a table data, accessible by an entry number, wherein said entry number and said table entry each having a data length less than the length of one of said plurality of color data;

a table registration updating device forming an entry number from data components of a color data selected from said plurality of color data, forming a table data from remaining data components of said color data not used in forming said entry number, storing said table data into a table entry corresponding to said entry number, and setting the validity indicator of said table entry to indicate the validity of said table entry;

a converting device converting said plurality of color data into corresponding pallet data, wherein for each of said plurality of color data, an entry number is formed from data components of said color data, the table entry corresponding to said entry number is retrieved from said table, and said entry number is outputted as pallet data when the table data of said table entry coincides with the table data formed from the remaining data components of said color data not used in forming said entry number; and a reverse converting device converting said pallet data back into said corresponding plurality of color data, wherein for each pallet data, the table entry corresponding to said pallet data is retrieved from said table and color data is reconstructed from said pallet data and the table data of said table entry retrieved.

34. A method of managing a plurality of color data in a predetermined color space, each color data having multiple data components, comprising the steps of:

storing a table having a plurality of table entries, each table entry, having a validity indicator and a table data, accessible by an entry number, wherein said entry number and said table entry each have a data length less than the length of one of said plurality of color data;

registering and updating table data into said table by forming an entry number from data components of a color data selected from said plurality of color data, forming a table data from remaining data components of said color data not used in forming said entry number, storing said table data into a table entry corresponding to said entry number, and setting the validity indicator of said table entry to indicate the validity of said table entry;

converting said plurality of color data into corresponding pallet data, wherein for each of said plurality of color data, an entry number is formed from data components of said color data, the table entry corresponding to said entry number is retrieved from said table, and said entry number is outputted as pallet data when the table data of said table entry coincides with the table data formed from the remaining data components of said color data not used in forming said entry number; and reconverting said pallet data back into said corresponding plurality of color data, wherein for each pallet data, the table entry corresponding to said pallet data is retrieved from said table and color data is reconstructed from said pallet data and the table data of said table entry retrieved.

* * * * *